United States Patent
Shigeeda

(10) Patent No.: US 11,007,881 B2
(45) Date of Patent: May 18, 2021

(54) INTER-VEHICLE TRANSMISSION SYSTEM AND TRANSMISSION DEVICE

(71) Applicant: Mitsubishi Electric Corporation, Tokyo (JP)

(72) Inventor: Tetsuya Shigeeda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 19 days.

(21) Appl. No.: 16/342,552

(22) PCT Filed: Oct. 24, 2016

(86) PCT No.: PCT/JP2016/081464
§ 371 (c)(1),
(2) Date: Apr. 17, 2019

(87) PCT Pub. No.: WO2018/078697
PCT Pub. Date: May 3, 2018

(65) Prior Publication Data
US 2019/0248249 A1    Aug. 15, 2019

(51) Int. Cl.
*B60L 15/42* (2006.01)
*H04B 1/3822* (2015.01)
(Continued)

(52) U.S. Cl.
CPC ............... *B60L 15/42* (2013.01); *B61G 5/10* (2013.01); *H04B 1/3822* (2013.01); *H04L 12/46* (2013.01);
(Continued)

(58) Field of Classification Search
CPC ........... B60L 15/42; B61G 5/10; H01H 1/605; H04B 3/02; H04B 3/548
(Continued)

(56) References Cited

U.S. PATENT DOCUMENTS 7,724,650 B2 * 5/2010 Karam ................ H04L 1/22
340/425.2
8,488,617 B2 * 7/2013 Takeyama ........... H04L 12/4625
370/400

(Continued)

FOREIGN PATENT DOCUMENTS

| JP | H0271621 A | 3/1990 |
| JP | 2016019417 A | 2/2016 |
| WO | 2014199431 A1 | 12/2014 |

OTHER PUBLICATIONS

International Search Report (with English translation) and Written Opinion issued in corresponding International Patent Application No. PCT/ PCT/JP2016/081464, 17 pages (dated Jan. 17, 2017).

(Continued)

*Primary Examiner* — Michael R. Fin
(74) *Attorney, Agent, or Firm* — Buchanan Ingersoll & Rooney PC

(57) ABSTRACT

A transmission device includes a pair of terminals connected to an electrical coupler via a pair of signal lines, a transmission unit connected to the pair of terminals via a pair of capacitors, a direct-current (DC) power supply connected in series between the pair of terminals without interposition of the pair of capacitors, and switches disposed on opposite sides of the DC power supply. A transmission device includes a pair of terminals connected to an electrical coupler via a pair of signal lines, a reception unit connected to the pair of terminals via a pair of capacitors, a load resistor and inductances connected in series between the pair of terminals without interposition of the pair of capacitors.

4 Claims, 14 Drawing Sheets

(51) Int. Cl.
*B61G 5/10* (2006.01)
*H04L 12/46* (2006.01)
*B61L 15/00* (2006.01)
*H04B 3/02* (2006.01)

(52) U.S. Cl.
CPC ....... *B60L 2200/26* (2013.01); *B61L 15/0036* (2013.01); *H04B 3/02* (2013.01)

(58) Field of Classification Search
USPC ....................................................... 307/10.1
See application file for complete search history.

(56) References Cited

U.S. PATENT DOCUMENTS

2003/0061010 A1* 3/2003 Durston ................. G01R 31/11
702/189
2004/0264087 A1* 12/2004 Bishop ................. H04M 1/745
361/91.1
2016/0134319 A1 5/2016 Shigeeda

OTHER PUBLICATIONS

Notification of Reasons for Refusal (with Machine Translation) issued in corresponding Japanese Patent Application No. 2017-547175, 8 pages (dated Nov. 7, 2017).

* cited by examiner

INTER-VEHICLE TRANSMISSION SYSTEM AND TRANSMISSION DEVICE

FIELD

The present invention relates to an inter-vehicle transmission system and to a transmission device for signal transmission between vehicles electrically connected to each other through an electrical coupler.

BACKGROUND

Conventionally, vehicles electrically connected to each other through an electrical coupler communicate with each other through contacts of the electrical coupler provided on the vehicles.

An oxide covering may be formed on the surface of the contact. The oxide covering formed on the surface of the contact may cause a poor connection between the contacts and thus erroneous transmission in communication between the vehicles.

For the signal transmission scheme described in Patent Literature 1, a transmission device and a reception device are connected to each other through an electrical coupler on a wired line such that the transmission device sends a signal to the reception device through contacts of the electrical coupler. For this signal transmission scheme, also, the transmission unit includes a direct-current (DC) power supply for breaking the oxide covering on the contacts to ensure electrical connection between the contacts, and the reception unit includes a load resistor electrically connected to the DC power supply.

CITATION LIST

Patent Literature

Patent Literature 1: Japanese Patent Application Laid-open No. H2-71621

SUMMARY

Technical Problem

For the signal transmission scheme described in Patent Literature 1, unfortunately, the number of the inductances is large because the inductance is disposed on each side of the DC power supply, and the inductance is disposed on each side of the load resistor. Due to the large number of the inductances, the size of the device is large, which leads to the increased cost.

The present invention has been made in view of the foregoing, and it is an object of the present invention to provide an inter-vehicle transmission system including a reduced number of inductances, and still capable of breaking the oxide covering on the surface of a contact of an electrical coupler.

Solution to Problem

To solve the problem and achieve the object described above, an inter-vehicle transmission system according to the present invention comprises: a first transmission device disposed in a first vehicle including a first electrical coupler; and a second transmission device disposed in a second vehicle including a second electrical coupler electrically connected to the first electrical coupler, the second transmission device being capable of communicating with the first transmission device. The first transmission device includes a first pair of terminals connected to the first electrical coupler via a first pair of signal lines, a transmission unit connected to the first pair of terminals via a first pair of capacitors, a direct-current power supply connected in series between the first pair of terminals without interposition of the first pair of capacitors, and first and second switches connected in series to the direct-current power supply between the first pair of terminals, and disposed on opposite sides of the direct-current power supply, and the second transmission device includes a second pair of terminals connected to the second electrical coupler via a second pair of signal lines, a reception unit connected to the second pair of terminals via a second pair of capacitors, at least one load resistor connected in series between the second pair of terminals without interposition of the second pair of capacitors, and at least one inductance connected in series to the load resistor between the second pair of terminals.

Advantageous Effects of Invention

The present invention provides an advantage in reducing the number of inductances as well as achieving breakage of the oxide covering on the surface of the contact of the electrical coupler.

DESCRIPTION OF EMBODIMENTS

An inter-vehicle transmission system and a transmission device according to embodiments of the present invention will be described in detail below with reference to the drawings. Note that these embodiments are not intended to limit the scope of this invention.

First Embodiment

Figure 1:
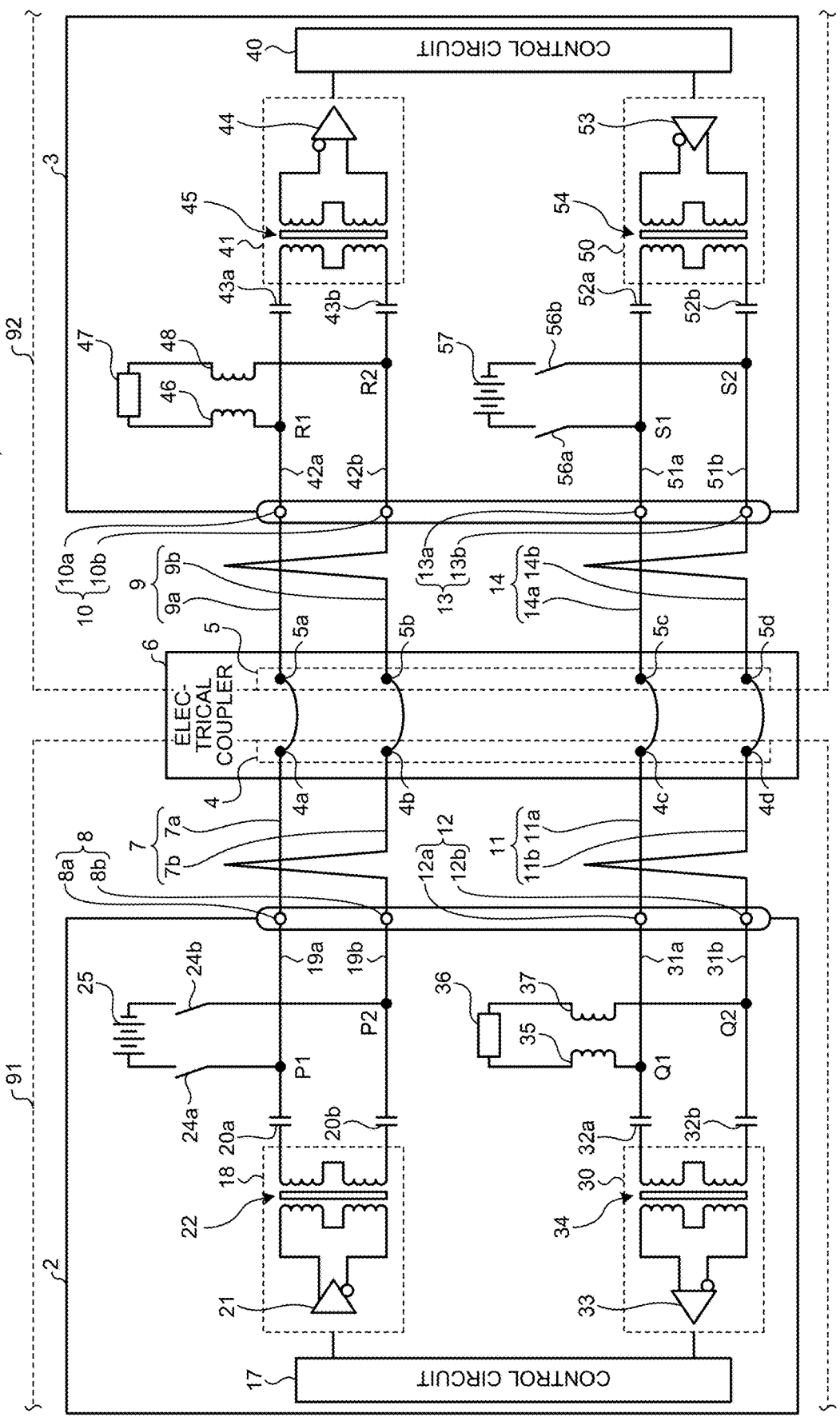
FIG. 1 is a diagram illustrating a configuration of an inter-vehicle transmission system according to a first embodiment.

FIG. 1 is a diagram illustrating a configuration of an inter-vehicle transmission system according to the present embodiment. The inter-vehicle transmission system 1 includes a transmission device 2 disposed in a vehicle 91, and a transmission device 3 disposed in a vehicle 92. The transmission device 3 is mechanically coupled to the vehicle 91 and capable of communicating with the transmission device 2. The vehicles 91 and 92 are each a train vehicle. The vehicle 91 is a first vehicle, and the vehicle 92 is a second vehicle. The transmission device 2 is a first transmission device, and the transmission device 3 is a second transmission device.

The vehicle 91 includes an electrical coupler 4, i.e., a first electrical coupler. The electrical coupler 4 includes a pair of contacts 4a and 4b and a pair of contacts 4c and 4d. The vehicle 92 includes an electrical coupler 5, i.e., a second electrical coupler. The electrical coupler 5 includes a pair of contacts 5a and 5b and a pair of contacts 5c and 5d. The electrical coupler 5 can be electrically coupled to the electrical coupler 4. The illustrated example illustrates the electrical couplers 4 and 5 electrically coupled to each other as defining an electrical coupler 6, in which the contact 4a is in contact with the contact 5a, the contact 4b is in contact with the contact 5b, the contact 4c is in contact with the contact 5c, and the contact 4d is in contact with the contact 5d.

The transmission device 2 includes a pair of terminals 8 and a pair of terminals 12. The pair of terminals 8 includes terminals 8a and 8b. The pair of terminals 12 includes terminals 12a and 12b. The transmission device 3 includes a pair of terminals 10 and a pair of terminals 13. The pair of terminals 10 includes terminals 10a and 10b. The pair of terminals 13 includes terminals 13a and 13b. The pair of terminals 8 is a first pair of terminals, and the pair of terminals 10 is a second pair of terminals.

The pair of terminals 8 is connected to the electrical coupler 4 via a pair of signal lines 7. The pair of signal lines 7 includes signal lines 7a and 7b. In more detail, the terminal 8a is connected to the contact 4a of the electrical coupler 4 via the signal line 7a, and the terminal 8b is connected to the contact 4b of the electrical coupler 4 via the signal line 7b. The pair of signal lines 7 is, for example, a twisted pair cable that serves as a transmission line. The twisted pair cable is, for example, an Ethernet (registered trademark) cable. The pair of signal lines 7 is a first pair of signal lines.

The pair of terminals 12 is connected to the electrical coupler 4 via a pair of signal lines 11. The pair of signal lines 11 includes signal lines 11a and 11b. In more detail, the terminal 12a is connected to the contact 4c of the electrical coupler 4 via the signal line 11a, and the terminal 12b is connected to the contact 4d of the electrical coupler 4 via the signal line 11b. The pair of signal lines 11 is, for example, a twisted pair cable that serves as a transmission line. The twisted pair cable is, for example, an Ethernet (registered trademark) cable.

The pair of terminals 10 is connected to the electrical coupler 5 via a pair of signal lines 9. The pair of signal lines 9 includes signal lines 9a and 9b. In more detail, the terminal 10a is connected to the contact 5a of the electrical coupler 5 via the signal line 9a, and the terminal 10b is connected to the contact 5b of the electrical coupler 5 via the signal line 9b. The pair of signal lines 9 is, for example, a twisted pair cable that serves as a transmission line. The twisted pair cable is, for example, an Ethernet (registered trademark) cable. The pair of signal lines 9 is a second pair of signal lines.

The pair of terminals 13 is connected to the electrical coupler 5 via a pair of signal lines 14. The pair of signal lines 14 includes signal lines 14a and 14b. In more detail, the terminal 13a is connected to the contact 5c of the electrical coupler 5 via the signal line 14a, and the terminal 13b is connected to the contact 5d of the electrical coupler 5 via the signal line 14b. The pair of signal lines 14 is, for example, a twisted pair cable that serves as a transmission line. The twisted pair cable is, for example, an Ethernet (registered trademark) cable.

The configuration of the transmission device 2 will next be described. The transmission device 2 includes a transmission unit 18, a direct-current (DC) power supply 25, and switches 24a and 24b. The transmission unit 18 is connected to the pair of terminals 8 via a pair of capacitors 20a and 20b. The DC power supply 25 is connected in series between the terminals 8a and 8b without interposition of the pair of capacitors 20a and 20b. The switches 24a and 24b are connected in series to the DC power supply 25 between the terminals 8a and 8b, and disposed on opposite sides of the DC power supply 25. The pair of capacitors 20a and 20b is a first pair of capacitors. The switch 24a is a first switch, and the switch 24b is a second switch.

The transmission unit 18 can send a signal to the transmission device 3. The transmission unit 18 includes a transmission circuit 21, and a pulse transformer 22 connected to the transmission circuit 21. The transmission circuit 21 sends a signal through the pulse transformer 22. The signal is a differential signal.

The transmission unit 18 is connected to the pair of terminals 8 via the pair of capacitors 20a and 20b and via a pair of signal lines 19a and 19b. In more detail, the capacitor 20a has one end connected to the transmission unit 18, and has the other end connected to the terminal 8a via the signal line 19a. The capacitor 20b has one end connected to the transmission unit 18, and has the other end connected to the terminal 8b via the signal line 19b.

The switch 24a has one end connected to the signal line 19a at a point between the other end of the capacitor 20a and the terminal 8a. The connection point between the one end of the switch 24a and the signal line 19a is designated by P1. The switch 24a has the other end connected to one end (in the illustrated example, the positive terminal end) of the DC power supply 25. The DC power supply 25 has the other end (in the illustrated example, the negative terminal end) connected to one end of the switch 24b. The switch 24b has the other end connected to the signal line 19b at a point between the other end of the capacitor 20b and the terminal 8b. The connection point between the other end of the switch 24b and the signal line 19b is designated by P2. The pair of switches 24a and 24b is disposed on opposite sides of the DC power supply 25. Specifically, the switch 24a is disposed on the side closer to the positive terminal of the DC power supply 25, and the switch 24b is disposed on the side closer to the negative terminal of the DC power supply 25.

The transmission device 2 also includes a reception unit 30, a load resistor 36, and inductances 35 and 37. The reception unit 30 is connected to the pair of terminals 12 via a pair of capacitors 32a and 32b. The load resistor 36 is connected in series between the terminals 12a and 12b without interposition of the pair of capacitors 32a and 32b. The inductances 35 and 37 are connected in series to the load resistor 36 between the terminals 12a and 12b.

The reception unit 30 can receive a signal from the transmission device 3. The reception unit 30 includes a reception circuit 33, and a pulse transformer 34 connected to the reception circuit 33. The reception circuit 33 receives a signal through the pulse transformer 34. The signal is a differential signal.

The reception unit 30 is connected to the pair of terminals 12 via the pair of capacitors 32a and 32b and via a pair of signal lines 31a and 31b. In more detail, the capacitor 32a has one end connected to the reception unit 30, and has the other end connected to the terminal 12a via the signal line 31a. The capacitor 32b has one end connected to the reception unit 30, and has the other end connected to the terminal 12b via the signal line 31b.

The inductance 35 has one end connected to the signal line 31a at a point between the other end of the capacitor 32a and the terminal 12a. The connection point between the one end of the inductance 35 and the signal line 31a is designated by Q1. The inductance 35 has the other end connected to one end of the load resistor 36. The load resistor 36 has the other end connected to one end of the inductance 37. The inductance 37 has the other end connected to the signal line 31b at a point between the other end of the capacitor 32b and the terminal 12b. The connection point between the other end of the inductance 37 and the signal line 31b is designated by Q2. The pair of inductances 35 and 37, which is disposed on opposite sides of the load resistor 36, forms a pair.

The transmission device 2 further includes a control circuit 17 connected to the transmission unit 18 and to the reception unit 30. The control circuit 17 controls signal transmission performed by the transmission unit 18 and signal reception performed by the reception unit 30. The control circuit 17 also controls on-off switching of each of the switches 24a and 24b.

Figure 2:
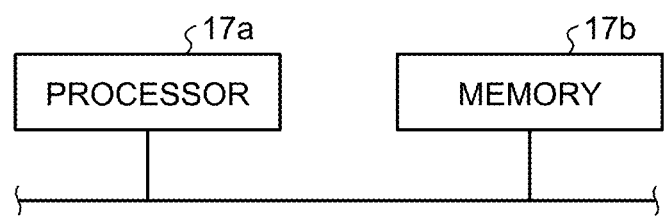
FIG. 2 is a diagram illustrating an example of the configuration of the control circuit in the first embodiment.

FIG. 2 is a diagram illustrating an example of the configuration of the control circuit 17. As illustrated in FIG. 2, the control circuit 17 includes a processor 17a and a memory 17b. Typically, the processor 17a is a central processing unit (CPU), and the memory 17b is a random access memory (RAM) and a read-only memory (ROM). The memory 17b stores a control program. In the control circuit 17, the processor 17a reads and executes a control program stored in the memory 17b. The control circuit 17 may be a dedicated hardware element, e.g., a processing circuit. Where the processing circuit is a dedicated hardware element, the processing circuit may be, for example, a single circuit, a set of multiple circuits, a programmed processor, a set of multiple programmed processors, an application specific integrated circuit (ASIC), a field programmable gate array (FPGA), or a combination thereof. The functions of the control circuit 17 may be individually implemented by a processing circuit, or be collectively implemented by the processing circuit.

The configuration of the transmission device 3 will next be described. The transmission device 3 includes a reception unit 41, a load resistor 47, and inductances 46 and 48. The reception unit 41 is connected to the pair of terminals 10 via a pair of capacitors 43a and 43b. The load resistor 47 is connected in series between the terminals 10a and 10b without interposition of the pair of capacitors 43a and 43b. The inductances 46 and 48 are connected in series to the load resistor 47 between the terminals 10a and 10b. The pair of capacitors 43a and 43b is a second pair of capacitors.

The reception unit 41 can receive a signal from the transmission device 2. The reception unit 41 includes a reception circuit 44, and a pulse transformer 45 connected to the reception circuit 44. The reception circuit 44 receives a signal through the pulse transformer 45. The signal is a differential signal.

The reception unit 41 is connected to the pair of terminals 10 via the pair of capacitors 43a and 43b and via a pair of signal lines 42a and 42b. In more detail, the capacitor 43a has one end connected to the reception unit 41, and has the other end connected to the terminal 10a via the signal line 42a. The capacitor 43b has one end connected to the reception unit 41, and has the other end connected to the terminal 10b via the signal line 42b.

The inductance 46 has one end connected to the signal line 42a at a point between the other end of the capacitor 43a and the terminal 10a. The connection point between the one end of the inductance 46 and the signal line 42a is designated by R1. The inductance 46 has the other end connected to one end of the load resistor 47. The load resistor 47 has the other end connected to one end of the inductance 48. The inductance 48 has the other end connected to the signal line 42b at a point between the other end of the capacitor 43b and the terminal 10b. The connection point between the other end of the inductance 48 and the signal line 42b is designated by R2. The pair of inductances 46 and 48, which is disposed on opposite sides of the load resistor 47, forms a pair.

The transmission device 3 also includes a transmission unit 50, a DC power supply 57, and switches 56a and 56b. The transmission unit 50 is connected to the pair of terminals 13 via a pair of capacitors 52a and 52b. The DC power supply 57 is connected in series between the terminals 13a and 13b without interposition of the pair of capacitors 52a and 52b. The switches 56a and 56b are connected in series to the DC power supply 57 between the terminals 13a and 13b, and disposed on opposite sides of the DC power supply 57.

The transmission unit 50 can send a signal to the transmission device 2. The transmission unit 50 includes a transmission circuit 53, and a pulse transformer 54 connected to the transmission circuit 53. The transmission circuit 53 sends a signal through the pulse transformer 54. The signal is a differential signal.

The transmission unit 50 is connected to the pair of terminals 13 via the pair of capacitors 52a and 52b and via a pair of signal lines 51a and 51b. In more detail, the capacitor 52a has one end connected to the transmission unit 50, and has the other end connected to the terminal 13a via the signal line 51a. The capacitor 52b has one end connected to the transmission unit 50, and has the other end connected to the terminal 13b via the signal line 51b.

The switch 56a has one end connected to the signal line 51a at a point between the other end of the capacitor 52a and the terminal 13a. The connection point between the one end of the switch 56a and the signal line 51a is designated by S1. The switch 56a has the other end connected to one end (in the illustrated example, the positive terminal end) of the DC power supply 57. The DC power supply 57 has the other end (in the illustrated example, the negative terminal end) connected to one end of the switch 56*b*. The switch 56*b* has the other end connected to the signal line 51*b* at a point between the other end of the capacitor 52*b* and the terminal 13*b*. The connection point between the other end of the switch 56*b* and the signal line 51*b* is designated by S2. The pair of switches 56*a* and 56*b* is disposed on opposite sides of the DC power supply 57. Specifically, the switch 56*a* is disposed on the side closer to the positive terminal of the DC power supply 57, and the switch 56*b* is disposed on the side closer to the negative terminal of the DC power supply 57.

The transmission device 3 further includes a control circuit 40 connected to the transmission unit 50 and to the reception unit 41. The control circuit 40 controls signal transmission performed by the transmission unit 50 and signal reception performed by the reception unit 41. The control circuit 40 also controls on-off switching of each of the switches 56*a* and 56*b*. The control circuit 40 is configured similarly to the control circuit 17.

An operation of the present embodiment will next be described. First, a description will be made as to signal transmission from the transmission device 2 to the transmission device 3. The assumption is that the switches 24*a* and 24*b* are in an OFF state.

The signal, which is sent from the transmission unit 18, passes through signal transmission lines and then is received by the reception unit 41. In this case, the signal transmission lines are defined by the pair of capacitors 20*a* and 20*b*, the pair of signal lines 19*a* and 19*b*, the pair of signal lines 7*a* and 7*b*, the electrical coupler 6, the pair of signal lines 9*a* and 9*b*, the pair of signal lines 42*a* and 42*b*, and the pair of capacitors 43*a* and 43*b*.

Because the carrier wave is an alternating current (AC) signal, the transmission unit 18 is connected through the pair of capacitors 20*a* and 20*b* to the pair of signal lines 19*a* and 19*b* by AC coupling, and the reception unit 41 is connected through the pair of capacitors 43*a* and 43*b* to the pair of signal lines 42*a* and 42*b* by AC coupling.

As described above, the load resistor 47 is connected to the signal transmission lines via the inductances 46 and 48. This configuration allows the inductances 46 and 48 to have a combined impedance L set such that the load resistor 47 does not act as a load on the transmission lines with a frequency co used in the signal transmission.

For example, when the transmission line has a characteristic impedance of 100Ω and the load resistor 47 has a resistance value R of 100Ω, the absence of the inductances 46 and 48 would cause the load resistor 47 to act as a load on the transmission line.

In contrast, the presence of the inductances 46 and 48 provides the combined impedance Z of the load resistor 47 and the inductances 46 and 48 with R+jωL, where j is the imaginary unit.

Thus, when the inductances 46 and 48 having an ωL value of, for example, 1 KΩ or higher where ω is a frequency used in signal transmission are used, the load resistor 47 and the inductances 46 and 48 act as a high-impedance part connected to the transmission line and having an impedance substantially ten or more times higher than the characteristic impedance of the transmission line. That is, the load resistor 47 becomes unlikely to act as a load with respect to the characteristic impedance of the transmission line, thereby reducing or eliminating the effect of the load resistor 47 on communication.

Figure 3:
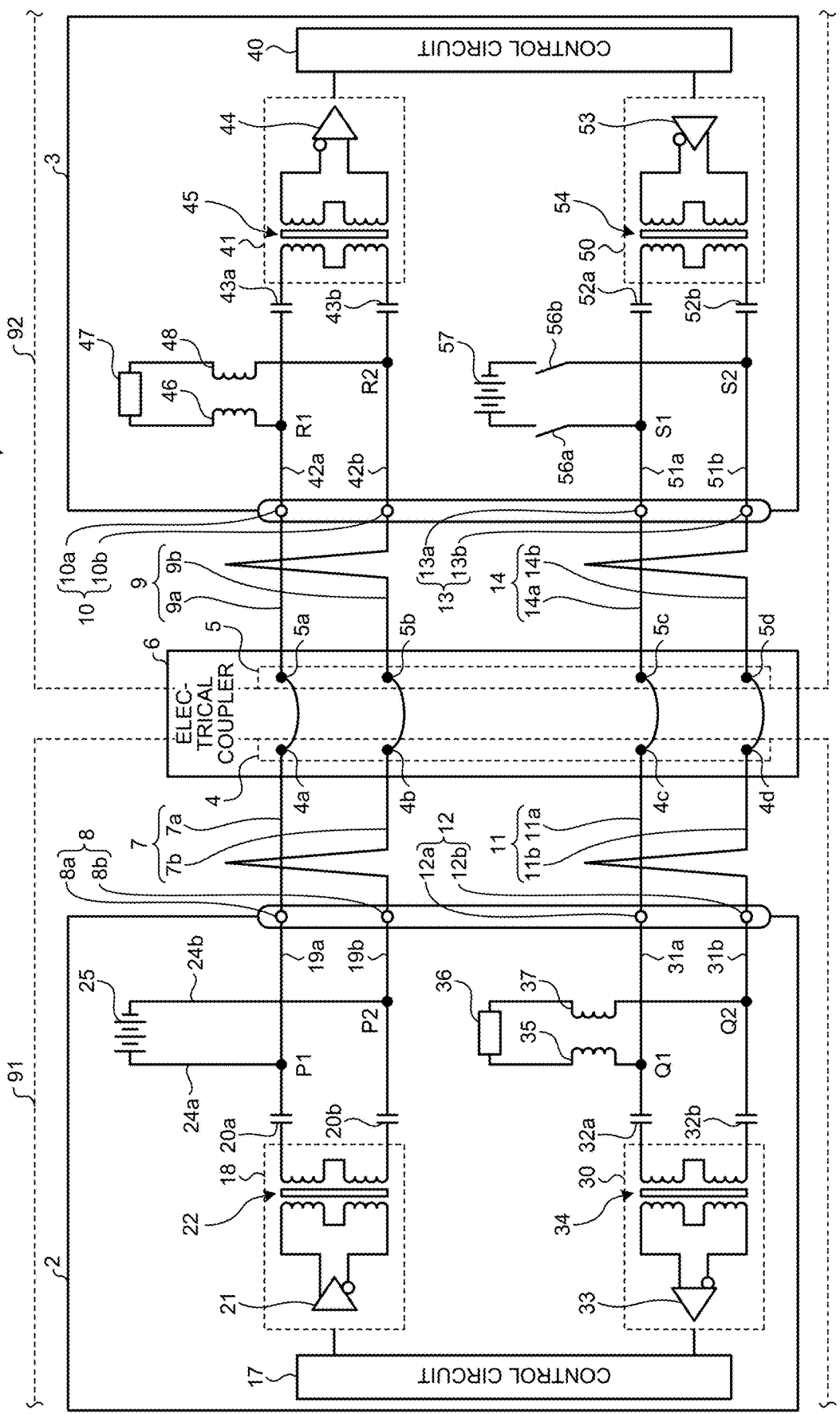
FIG. 3 is a diagram illustrating the inter-vehicle transmission system according to the first embodiment during superposition of a DC voltage.

Next, a description will be made as to an operation with the DC power supply 25 applying a DC voltage to the contacts 4*a* and 4*b* of the electrical coupler 4 and to the contacts 5*a* and 5*b* of the electrical coupler 5. FIG. 3 is a diagram illustrating the inter-vehicle transmission system according to the present embodiment during superposition of a DC voltage.

First, as illustrated in FIG. 3, the switches 24*a* and 24*b* are turned on under the control of the control circuit 17. When the switches 24*a* and 24*b* are placed in an ON state, the DC power supply 25 is electrically connected to the load resistor 47 through the electrical coupler 6. In more detail, this forms a closed circuit in which a DC current flows from the DC power supply 25, passes through the signal line 19*a*, the terminal 8*a*, the signal line 7*a*, the contact 4*a*, the contact 5*a*, the signal line 9*a*, the terminal 10*a*, the signal line 42*a*, the inductance 46, the load resistor 47, the inductance 48, the signal line 42*b*, the terminal 10*b*, the signal line 9*b*, the contact 5*b*, the contact 4*b*, the signal line 7*b*, the terminal 8*b*, and the signal line 19*b*, in order, and flows back to the DC power supply 25.

Thus, the DC power supply 25 forms a closed circuit together with the load resistor 47 during the ON state of the switches 24*a* and 24*b*. This allows the DC power supply 25 to apply DC voltages between the contacts 4*a* and 5*a* and between the contacts 4*b* and 5*b*, such that when an oxide covering is formed on the surface of at least one of the contacts 4*a*, 4*b*, 5*a*, and 5*b*, such an oxide covering can be broken. The resistance value R of the load resistor 47 is adjusted to prevent an excessive DC current from flowing therethrough.

Note that, in the present embodiment, a signal is transmitted from the transmission unit 18 to the reception unit 41 only when the switches 24*a* and 24*b* are in the OFF state. No signal is transmitted from the transmission unit 18 to the reception unit 41 when the switches 24*a* and 24*b* are in the ON state. During the signal transmission, the effect of the DC power supply 25 on the transmission lines is eliminated.

In the present embodiment, the control circuit 17 limits the time duration of the ON state of the switches 24*a* and 24*b* during an operation of the inter-vehicle transmission system 1. In other words, the time duration of the OFF state of the switches 24*a* and 24*b* is set.

Maintaining the switches 24*a* and 24*b* constantly in the ON state would result in an increased amount of heat generation in the load resistor 47, and thus also result in an increased power consumption. In contrast, setting the time duration of the OFF state of the switches 24*a* and 24*b* limits the amount of heat generation in the load resistor 47, and thus also limits power consumption.

The control circuit 17 may provide on-off control on the switches 24*a* and 24*b* as follows, by way of example.

The control circuit 17 can places the switches 24*a* and 24*b* in the ON state for a certain time period since detection of erroneous transmission, and then turn off the switches 24*a*, 24*b* after a lapse of that time period. This reduces the erroneous transmission due to an oxide covering formed on the surface of at least one of the contacts 4*a*, 4*b*, 5*a*, and 5*b*. The control circuit 17 determines that erroneous transmission has occurred when, for example, no response to a signal transmitted from the transmission unit 18 to the reception unit 41 is received from the transmission unit 50.

The control circuit 17 can also places the switches 24*a* and 24*b* in the ON state for a certain time period since the start-up of the inter-vehicle transmission system 1, and then turn off the switches 24*a* and 24*b* after a lapse of that time period. This can break the oxide covering formed on the surface of at least one of the contacts 4*a*, 4*b*, 5*a*, and 5*b* after the start-up. The term "start-up of the inter-vehicle transmission system 1", as used herein, refers to a time point when the inter-vehicle transmission system 1 is powered to start up. In more detail, such term refers to the time of start-up of the power supplies on the entire train including the vehicles 91 and 92.

The control circuit 17 can also places the switches 24a and 24b in the ON state for a certain time period since the time point when the electrical coupler 4 and the electrical coupler 5 are electrically coupled together, and then turn off the switches 24a and 24b after a lapse of that time period. This can break the oxide covering formed on the surface of at least one of the contacts 4a, 4b, 5a, and 5b after the electrical coupler 4 and the electrical coupler 5 are coupled together.

The transmission device 3 transmits a signal to the transmission device 2 in the same manner as discussed above. The DC power supply 57 applies DC voltages to the contacts 4c and 4d of the electrical coupler 4 and to the contacts 5c and 5d of the electrical coupler 5 in the same manner as discussed above.

In the present embodiment, the switches 24a and 24b are disposed on the opposite sides of the DC power supply 25. The inductances 46 and 48 are disposed on the opposite sides of the load resistor 47. The switches 56a and 56b are disposed on the opposite sides of the DC power supply 57. The inductances 35 and 37 are disposed on the opposite sides of the load resistor 36.

Because no inductances are connected to the DC power supplies 25 and 57, the number of inductances are reduced as compared to the conventional technology described in Patent Literature 1.

During signal transmission from the transmission device 2 to the transmission device 3, the switches 24a and 24b are turned off to thereby disconnect the DC power supply 25 from the transmission lines while the load resistor 47 is connected to the transmission lines via the inductances 46 and 48. This makes the DC power supply 25 and the load resistor 47 unlikely to act as a load on the transmission lines. As a result, it becomes possible to reduce or prevent degradation in quality of communication data.

Similarly, during signal transmission from the transmission device 3 to the transmission device 2, the switches 56a and 56b are turned off to thereby disconnect the DC power supply 57 from the transmission lines while the load resistor 36 is connected to the transmission lines via the inductances 35 and 37. This makes the DC power supply 57 and the load resistor 36 unlikely to act as a load on the transmission lines. As a result, it becomes possible to reduce or prevent degradation in quality of communication data.

According to the present embodiment, the provision of the switches 24a, 24b, 56a, and 56b reduces the amounts of heat generated in the load resistors 47 and 36, and thus reduces power consumption.

Also according to the present embodiment, when an oxide covering is formed on the surface of at least one of the contacts 4a to 4d and the contacts 5a to 5d of the electrical coupler 6, such oxide covering can be broken.

In the present embodiment, the switches 24a and 24b are disposed on the transmission side. This allows the control circuit 17 to control the timing of signal transmission and the timing at which to switch on and off the switches 24a and 24b. The switches 56a and 56b are disposed on the transmission side. This allows control circuit 40 to control the timing of signal transmission and the timing at which to switch on and off the switches 56a and 56b. Other advantages of the inter-vehicle transmission system 1 of the present embodiment are achieved as described in connection with the description of the operation.

Note that the DC power supply 25 may be a dedicated power supply, or may be a voltage source of a voltage converted from the voltage of another power supply installed in the vehicle 91. The same goes for the DC power supply 57.

Second Embodiment

Figure 4:
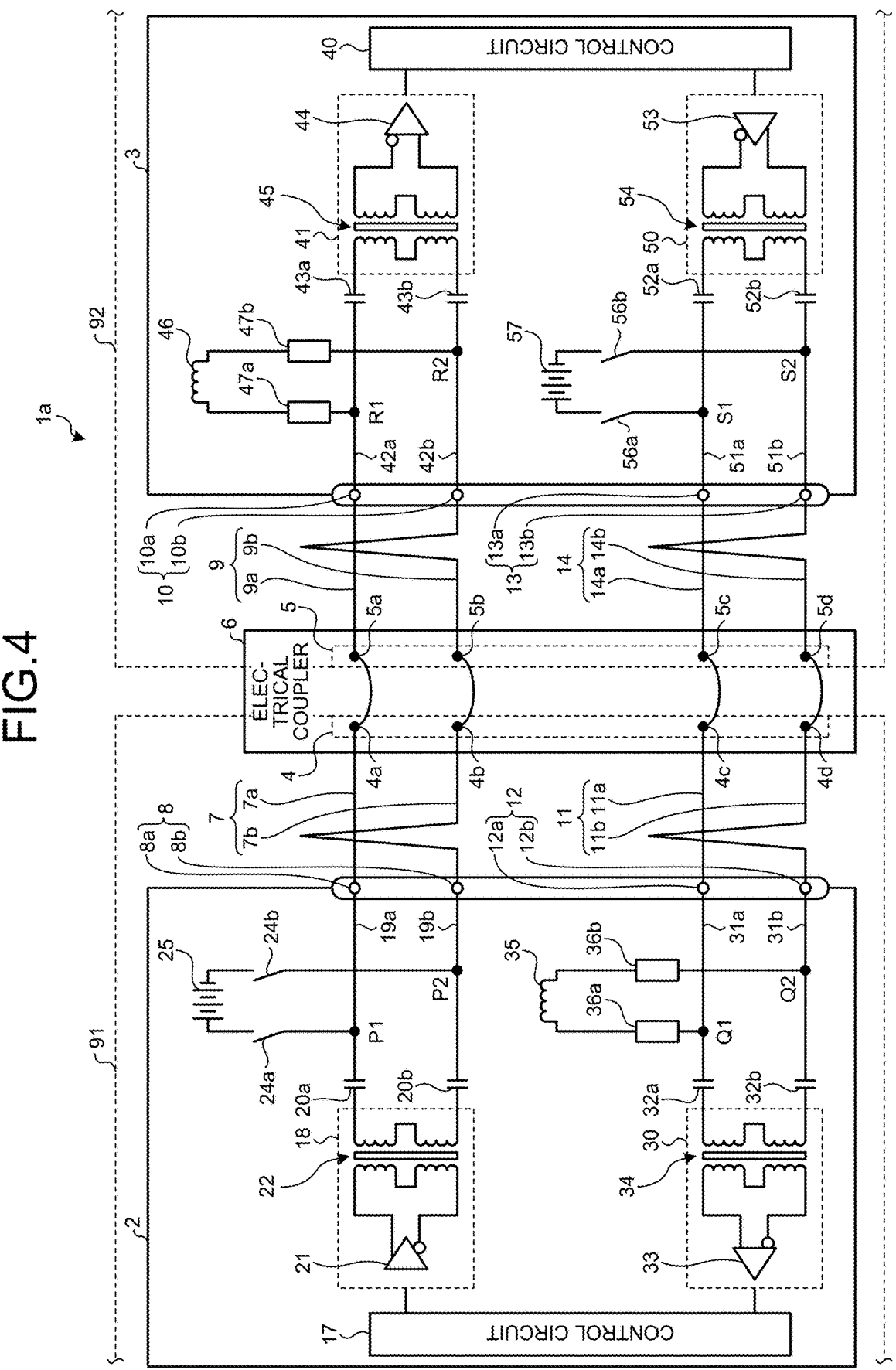
FIG. 4 is a diagram illustrating a configuration of an inter-vehicle transmission system according to a second embodiment.

FIG. 4 is a diagram illustrating a configuration of an inter-vehicle transmission system according to the present embodiment. An inter-vehicle transmission system 1a differs from the inter-vehicle transmission system 1 illustrated in FIG. 1 in that the transmission device 2 includes the inductance 35 and load resistors 36a and 36b between the connection points Q1 and Q2, and the transmission device 3 includes the inductance 46 and load resistors 47a and 47b between the connection points R1 and R2. The load resistors 36a and 36b form a pair disposed on opposite sides of the inductance 35. The load resistors 36a and 36b are each connected in series to the inductance 35. The load resistors 47a and 47b form a pair disposed on opposite sides of the inductance 46. The load resistors 47a and 47b are each connected in series to the inductance 46.

The other part of the inter-vehicle transmission system 1a is the same as that of the inter-vehicle transmission system 1 illustrated in FIG. 1. In FIG. 4, like reference characters designate the same components as the components illustrated in FIG. 1.

The present embodiment can reduce the number of inductances as compared to the first embodiment.

In the present embodiment, the load resistors 47a and 47b are disposed on opposite sides of the inductance 46. This configuration results in a symmetrical arrangement of the inductance 46 and the load resistors 47a and 47b with respect to the pair of signal lines 42a and 42b and to the pair of signal lines 9. Other operations and advantages of the inter-vehicle transmission system 1a of the present embodiment are similar to those of the inter-vehicle transmission system of the first embodiment.

Third Embodiment

Figure 5:
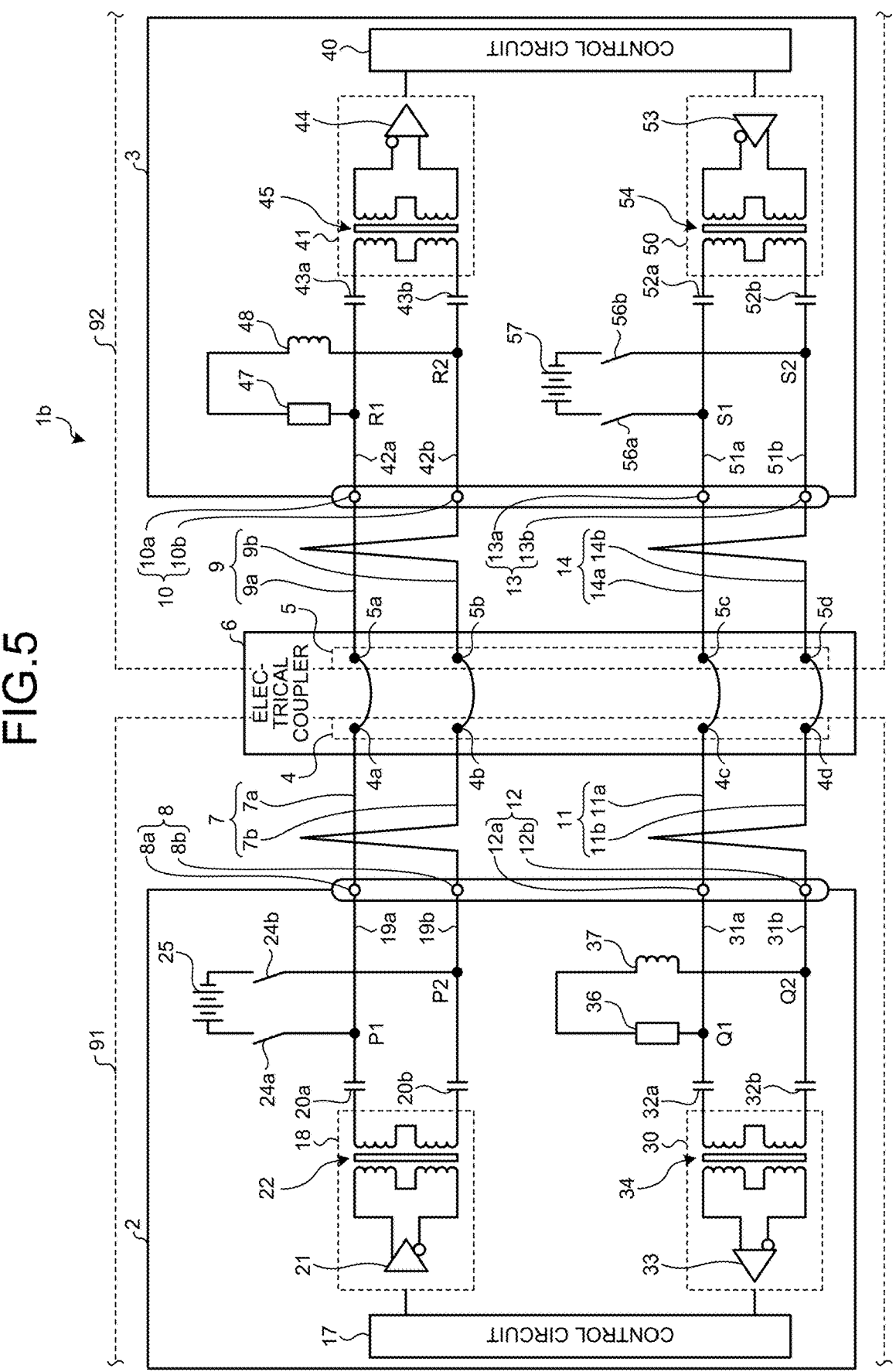
FIG. 5 is a diagram illustrating a configuration of an inter-vehicle transmission system according to a third embodiment.

FIG. 5 is a diagram illustrating a configuration of an inter-vehicle transmission system according to the present embodiment. An inter-vehicle transmission system 1b differs from the inter-vehicle transmission system 1 illustrated in FIG. 1 in that the transmission device 2 includes the load resistor 36 and the inductance 37 between the connection points Q1 and Q2, and the transmission device 3 includes the load resistor 47 and the inductance 48 between the connection points R1 and R2. The load resistor 36 is connected in series to the inductance 37, and the load resistor 47 is connected in series to the inductance 48.

The other part of the inter-vehicle transmission system 1b is the same as that of the inter-vehicle transmission system 1 illustrated in FIG. 1. In FIG. 5, like reference characters designate the same components as the components illustrated in FIG. 1.

The present embodiment can further reduce the number of inductances as compared to the first embodiment.

Moreover, the present embodiment can also reduce the number of load resistors as compared to the second embodiment. Other operations and advantages of the inter-vehicle transmission system 1b of the present embodiment are similar to those of the inter-vehicle transmission system of the first embodiment.

Fourth Embodiment

Figure 6:
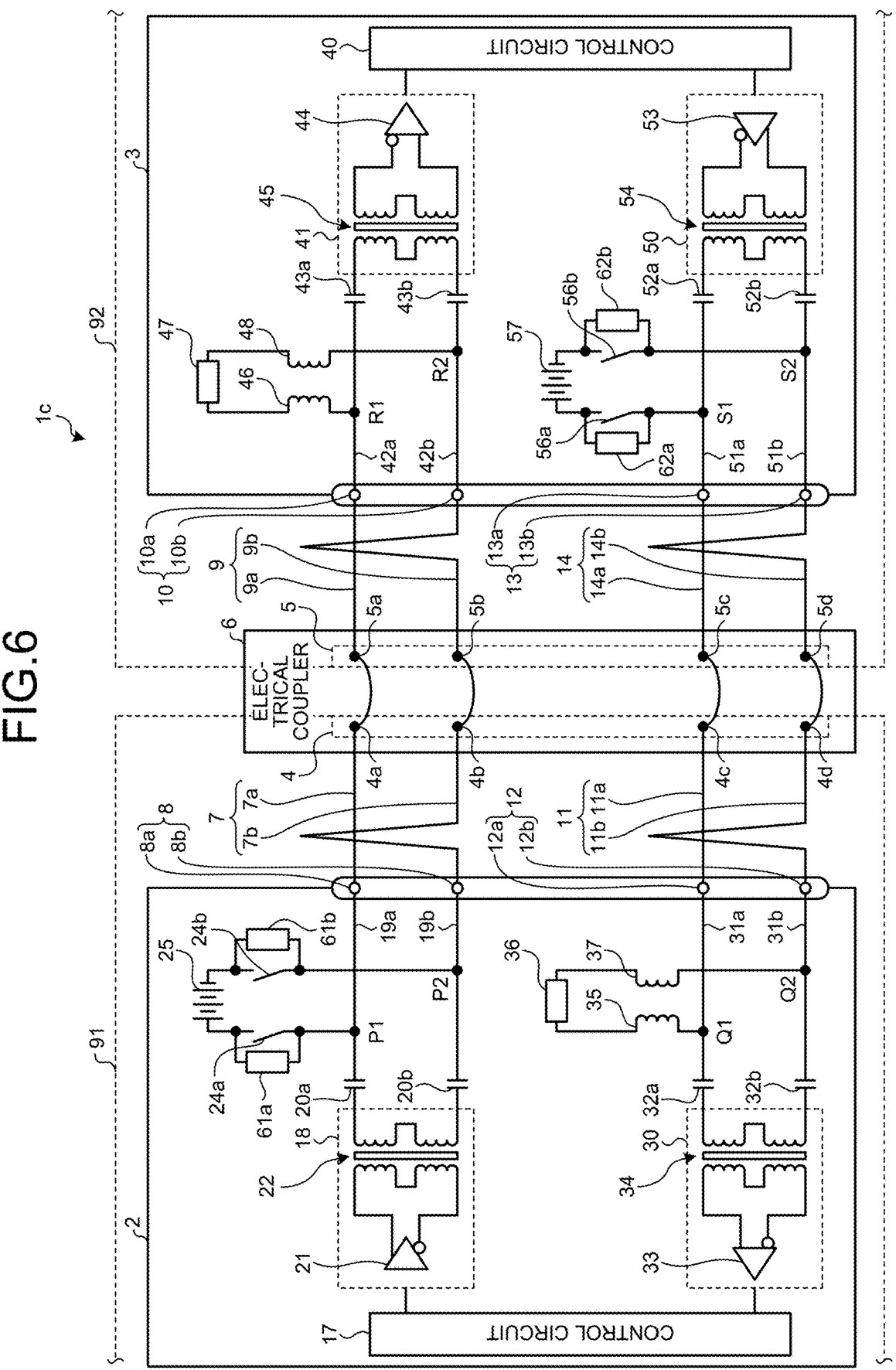
FIG. 6 is a diagram illustrating a configuration of an inter-vehicle transmission system according to a fourth embodiment.

FIG. 6 is a diagram illustrating a configuration of an inter-vehicle transmission system according to the present embodiment. An inter-vehicle transmission system 1c differs from the inter-vehicle transmission system 1 illustrated in FIG. 1 in that the transmission device 2 includes a resistor 61a and a resistor 61b. The resistor 61a is connected in parallel to the switch 24a and in series to the DC power supply 25. The resistor 61b is connected in parallel to the switch 24b and in series to the DC power supply 25. The resistor 61a is a first resistor, and the resistor 61b is a second resistor.

The inter-vehicle transmission system 1c further differs from the inter-vehicle transmission system 1 illustrated in FIG. 1 in that the transmission device 3 includes a resistor 62a and a resistor 62b. The resistor 62a is connected in parallel to the switch 56a and in series to the DC power supply 57. The resistor 62b is connected in parallel to the switch 56b and in series to the DC power supply 57.

The other part of the inter-vehicle transmission system 1c is the same as that of the inter-vehicle transmission system 1 illustrated in FIG. 1. In FIG. 6, like reference characters designate the same components as the components illustrated in FIG. 1.

The resistance values of the resistors 61a and 61b are set so that the resistors 61a and 61b have little or no effect on the characteristic impedance of the transmission line from the transmission unit 18 to the reception unit 41. In particular, the resistance values of the resistors 61a and 61b are set so that the ratio of the combined resistance value of the resistors 61a and 61b to the characteristic impedance of the transmission line will be a predetermined value or lower. For example, for a transmission line having a characteristic impedance of 100Ω, a combined resistance value of the resistors 61a and 61b are set to be 10 kΩ or higher in order that the effect of the resistors 61a and 61b on the characteristic impedance is limited to 1% or less. For example, a resistance value of each of the resistors 61a and 61b is set to 50 kΩ. The same goes for the resistors 62a and 62b.

When the switches 24a and 24b are switched from the ON state to the OFF state, high voltages induced by the inductances 46 and 48 may develop between the contact portions of the switch 24a and between the contact portions of the switch 24b, thereby wearing the contact portions of the switch 24a and the contact portions of the switch 24b.

Connecting the resistor 61a in parallel to the switch 24a and connecting the resistor 61b in parallel to the switch 24b, as in the present embodiment, reduce or prevent the development of the high voltages between the contact portions of the switch 24a and between the contact portions of the switch 24b, thereby reducing or preventing wear of the contact portions of the switch 24a and of the contact portions of the switch 24b.

Similarly, connecting the resistor 62a in parallel to the switch 56a and connecting the resistor 62b in parallel to the switch 56b reduces or prevents development of high voltages between the contact portions of the switch 56a and between the contact portions of the switch 56b, thereby reducing or preventing wear of the contact portions of the switch 56a and of the contact portions of the switch 56b.

Other operations and advantages of the inter-vehicle transmission system 1c of the present embodiment are similar to those of the inter-vehicle transmission system of the first embodiment.

Fifth Embodiment

Figure 7:
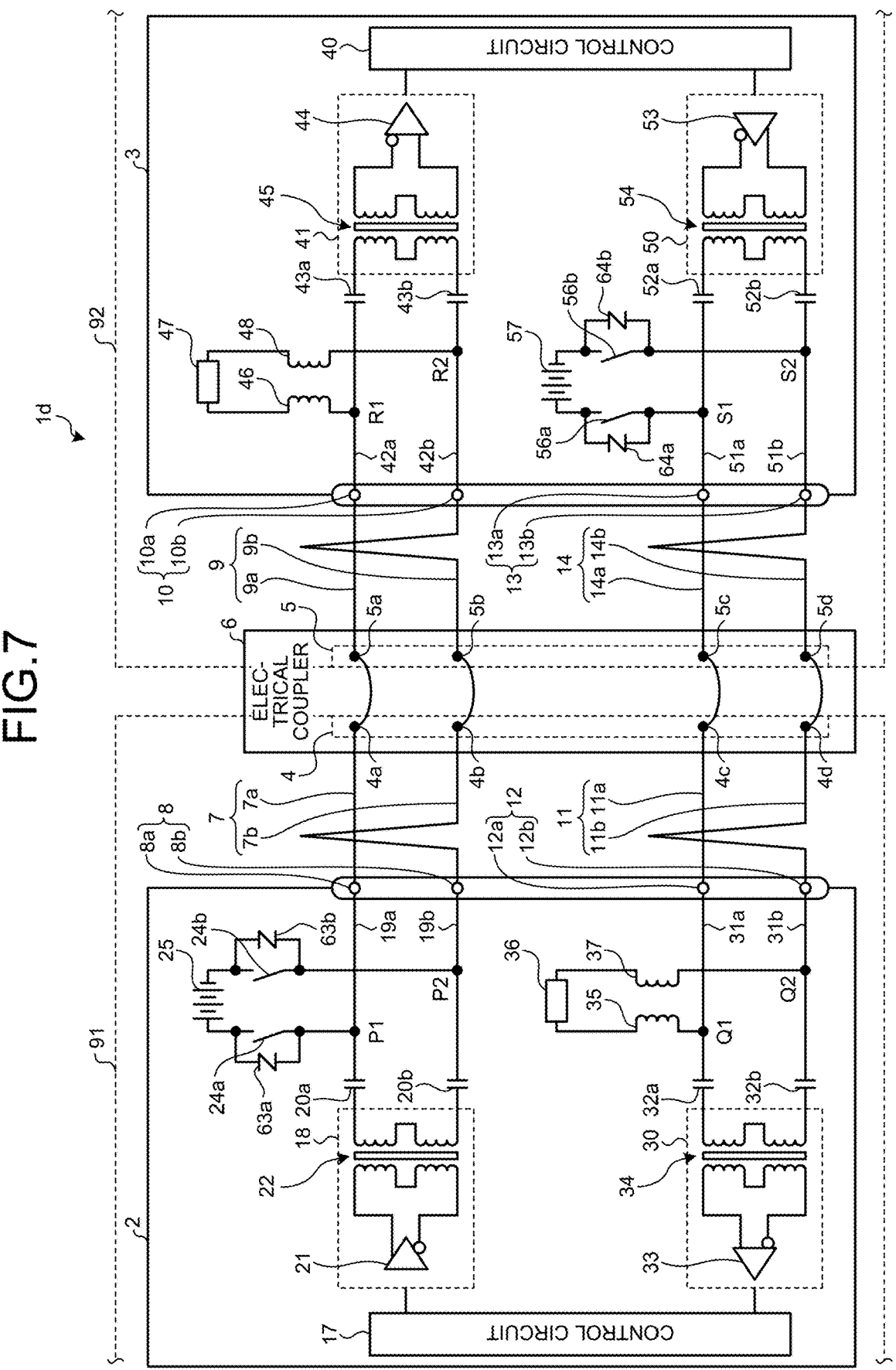
FIG. 7 is a diagram illustrating a configuration of an inter-vehicle transmission system according to a fifth embodiment.

FIG. 7 is a diagram illustrating a configuration of an inter-vehicle transmission system according to the present embodiment. An inter-vehicle transmission system 1d differs from the inter-vehicle transmission system 1 illustrated in FIG. 1 in that the transmission device 2 includes a varistor 63a and a varistor 63b. The varistor 63a is connected in parallel to the switch 24a and in series to the DC power supply 25. The varistor 63b is connected in parallel to the switch 24b and in series to the DC power supply 25. The varistor 63a is a first varistor, and the varistor 63b is a second varistor.

The inter-vehicle transmission system 1d further differs from the inter-vehicle transmission system 1 illustrated in FIG. 1 in that the transmission device 3 includes a varistor 64a and a varistor 64b. The varistor 64a is connected in parallel to the switch 56a and in series to the DC power supply 57. The varistor 64b is connected in parallel to the switch 56b and in series to the DC power supply 57.

The other part of the inter-vehicle transmission system 1d is the same as that of the inter-vehicle transmission system 1 illustrated in FIG. 1. In FIG. 7, like reference characters designate the same components as the components illustrated in FIG. 1.

The capacitance values of the varistors 63a and 63b are set so that the varistors 63a and 63b have little or no effect on the characteristic impedance of the transmission line from the transmission unit 18 to the reception unit 41. In order that the effect of the varistors 63a and 63b on a 100-Ω characteristic impedance of a transmission line is limited to 1% or less, a value of a combined capacitance C of the varistors 63a and 63b is determined to satisfy the following relationship:

$$100/0.01=1/(2\pi \times \omega \times C)$$

where ω [Hz] represents the fundamental frequency of the transmission. When a fundamental frequency is 31.25 MHz (ω=31.25 MHz), the combined capacitance is 0.5 pF (C=0.5 pF). The same goes for the varistors 64a and 64b.

When the switches 24a and 24b are switched from the ON state to the OFF state, high voltages induced by the inductances 46 and 48 may develop between the contact portions of the switch 24a and between the contact portions of the switch 24b, thereby wearing the contact portions of the switch 24a and the contact portions of the switch 24b.

Connecting the varistor 63a in parallel to the switch 24a and connecting the varistor 63b in parallel to the switch 24b, as in the present embodiment, reduce or prevent the development of the high voltages between the contact portions of the switch 24a and between the contact portions of the switch 24b, thereby reducing or preventing wear of the contact portions of the switch 24a and of the contact portions of the switch 24b.

Similarly, connecting the varistor 64a in parallel to the switch 56a and connecting the varistor 64b in parallel to the switch 56b reduce or prevent the development of the high voltages between the contact portions of the switch 56a and between the contact portions of the switch 56b, thereby reducing or preventing wear of the contact portions of the switch 56a and of the contact portions of the switch 56b.

Other operations and advantages of the inter-vehicle transmission system 1d of the present embodiment are similar to those of the inter-vehicle transmission system of the first embodiment.

Sixth Embodiment

Figure 8:
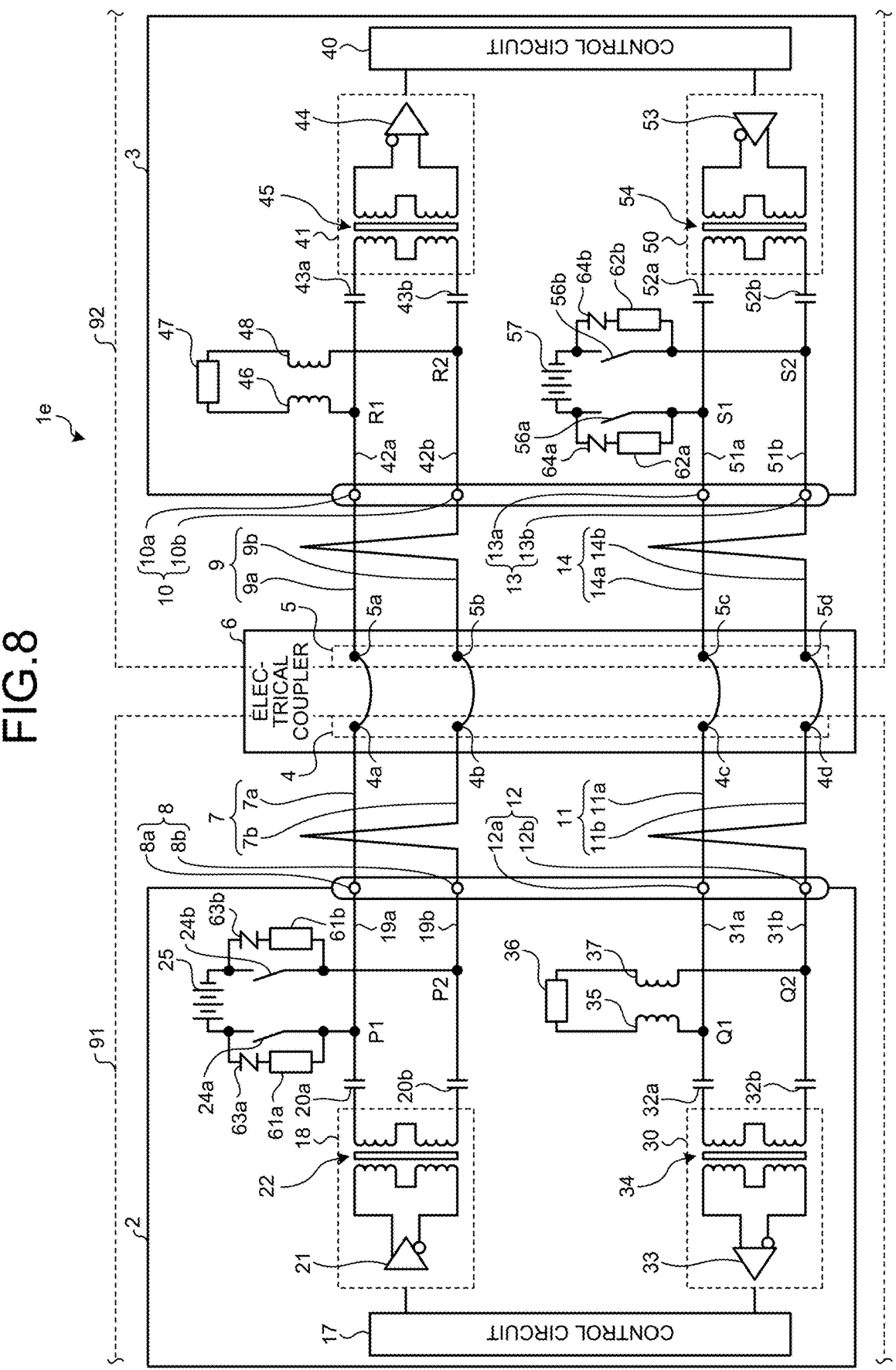
FIG. 8 is a diagram illustrating a configuration of an inter-vehicle transmission system according to a sixth embodiment.

FIG. 8 is a diagram illustrating a configuration of an inter-vehicle transmission system according to the present embodiment. An inter-vehicle transmission system 1e differs from the inter-vehicle transmission system 1 illustrated in FIG. 1 in that the transmission device 2 includes the resistor 61a, the varistor 63a, the resistor 61b, and the varistor 63b. The resistor 61a is connected in parallel to the switch 24a and in series to the DC power supply 25. The varistor 63a is connected in parallel to the switch 24a and in series to the DC power supply 25 and the resistor 61a. The resistor 61b is connected in parallel to the switch 24b and in series to the DC power supply 25. The varistor 63b is connected in parallel to the switch 24b and in series to the DC power supply 25 and the resistor 61b. The resistor 61a is a first resistor, and the resistor 61b is a second resistor. The varistor 63a is a first varistor, and the varistor 63b is a second varistor.

The inter-vehicle transmission system 1e further differs from the inter-vehicle transmission system 1 illustrated in FIG. 1 in that the transmission device 3 includes the resistor 62a, the varistor 64a, the resistor 62b, and the varistor 64b. The resistor 62a is connected in parallel to the switch 56a and in series to the DC power supply 57. The varistor 64a is connected in parallel to the switch 56a and in series to the DC power supply 57 and the resistor 62a. The resistor 62b is connected in parallel to the switch 56b and in series to the DC power supply 57. The varistor 64b is connected in parallel to the switch 56b and in series to the DC power supply 57 and the resistor 62b.

The other part of the inter-vehicle transmission system 1e is the same as that of the inter-vehicle transmission system 1 illustrated in FIG. 1. In FIG. 8, like reference characters designate the same components as the components illustrated in FIG. 1.

The inter-vehicle transmission system 1e of the present embodiment provides both advantages of the inter-vehicle transmission systems of the fourth and the fifth embodiments. Other operations and advantages of the inter-vehicle transmission system 1e of the present embodiment are similar to those of the inter-vehicle transmission system of the first embodiment.

Seventh Embodiment

Figure 9:
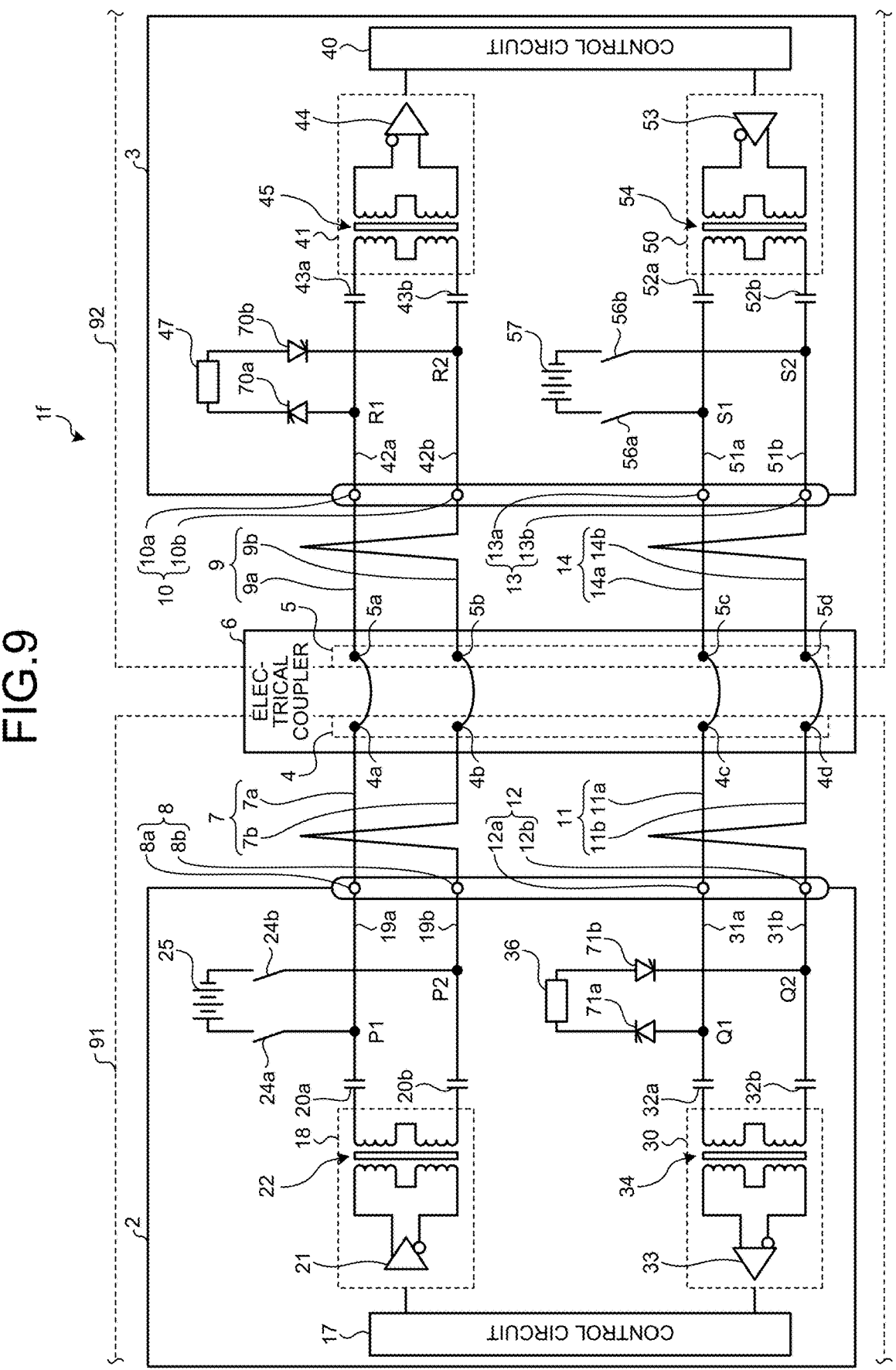
FIG. 9 is a diagram illustrating a configuration of an inter-vehicle transmission system according to a seventh embodiment.

FIG. 9 is a diagram illustrating a configuration of an inter-vehicle transmission system according to the present embodiment. An inter-vehicle transmission system if differs from the inter-vehicle transmission system 1 illustrated in FIG. 1 in that the transmission device 2 includes a PIN diode 71a in place of the inductance 35, and a PIN diode 71b in place of the inductance 37. A PIN diode is a three-layered diode having an intrinsic layer (I layer) defining a pn junction.

The inter-vehicle transmission system if further differs from the inter-vehicle transmission system 1 illustrated in FIG. 1 in that the transmission device 3 includes a PIN diode 70a in place of the inductance 46, and a PIN diode 70b in place of the inductance 48. The PIN diode 70a is a first PIN diode, and the PIN diode 70b is a second PIN diode.

The PIN diodes 70a and 70b are connected such that the DC power supply 25 applies a forward bias to the PIN diodes 70a, 70b with the switches 24a and 24b placed in the ON state. Similarly, the PIN diodes 71a and 71b are connected such that the DC power supply 57 applies a forward bias to the PIN diodes 71a and 71b with the switches 56a and 56b placed in the ON state.

The other part of the inter-vehicle transmission system if is the same as that of the inter-vehicle transmission system 1 illustrated in FIG. 1. In FIG. 9, like reference characters designate the same components as the components illustrated in FIG. 1.

During superposition of DC voltage, that is, when the switches 24a and 24b is placed in the ON state under the control of the control circuit 17, the PIN diodes 70a and 70b are forward-biased. When forward-biased, the resistance values of the PIN diodes 70a and 70b are so low that the DC power supply 25 is electrically connected to the load resistor 47 through the electrical coupler 6. The assumption is that the DC power supply 25 can apply a forward voltage to the PIN diodes 70a and 70b in superposing the DC voltage.

In more detail, a closed circuit is formed in which a DC current flows from the DC power supply 25, passes through the signal line 19a, the terminal 8a, the signal line 7a, the contact 4a, the contact 5a, the signal line 9a, the terminal 10a, the signal line 42a, the PIN diode 70a, the load resistor 47, the PIN diode 70b, the signal line 42b, the terminal 10b, the signal line 9b, the contact 5b, the contact 4b, the signal line 7b, the terminal 8b, and the signal line 19b, in order, and flows back to the DC power supply 25.

Thus, the DC power supply 25 forms a closed circuit together with the load resistor 47 during the ON state of the switches 24a and 24b. This allows the DC power supply 25 to apply DC voltages between the contacts 4a and 5a and between the contacts 4b and 5b, such that when an oxide covering is formed on the surface of at least one of the contacts 4a, 4b, 5a, and 5b, this oxide covering can be broken.

Note that, during the superposition of the DC voltage application, no signal is transmitted from the transmission unit 18 to the reception unit 41.

In contrast, during a time period in which no DC voltage is superposed, that is, when the switches 24a and 24b are placed in an OFF state under the control of the control circuit 17, no current flows through the PIN diodes 70a and 70b, unless a voltage applied to the PIN diodes 70a and 70b reaches the forward voltage. As a result, the load resistor 47 is substantially disconnected from the transmission lines. The assumption is that the amplitude of the signal transmitted over the signal lines 7 and 9, i.e., the amplitude of the AC voltage, is less than the forward voltage level. This makes the load resistor 47 unlikely to act as a load with respect to the characteristic impedance of the transmission line.

Although the above description has been made as to the signal transmission from the transmission unit 18 to the reception unit 41, the same goes for signal transmission from the transmission unit 50 to the reception unit 30.

Because the inter-vehicle transmission system of the present embodiment includes no inductance, the number of inductances can be reduced as compared to the first embodiment.

Although in the present embodiment, the PIN diodes 70a and 70b are disposed on the opposite sides of the load resistor 47, the inter-vehicle transmission system 1 may be configured to include either one of the PIN diodes 70a and 70b. The same goes for the PIN diodes 71a and 71b.

Other operations and advantages of the inter-vehicle transmission system if of the present embodiment are similar to those of the inter-vehicle transmission system of the first embodiment.

Eighth Embodiment

Figure 10:
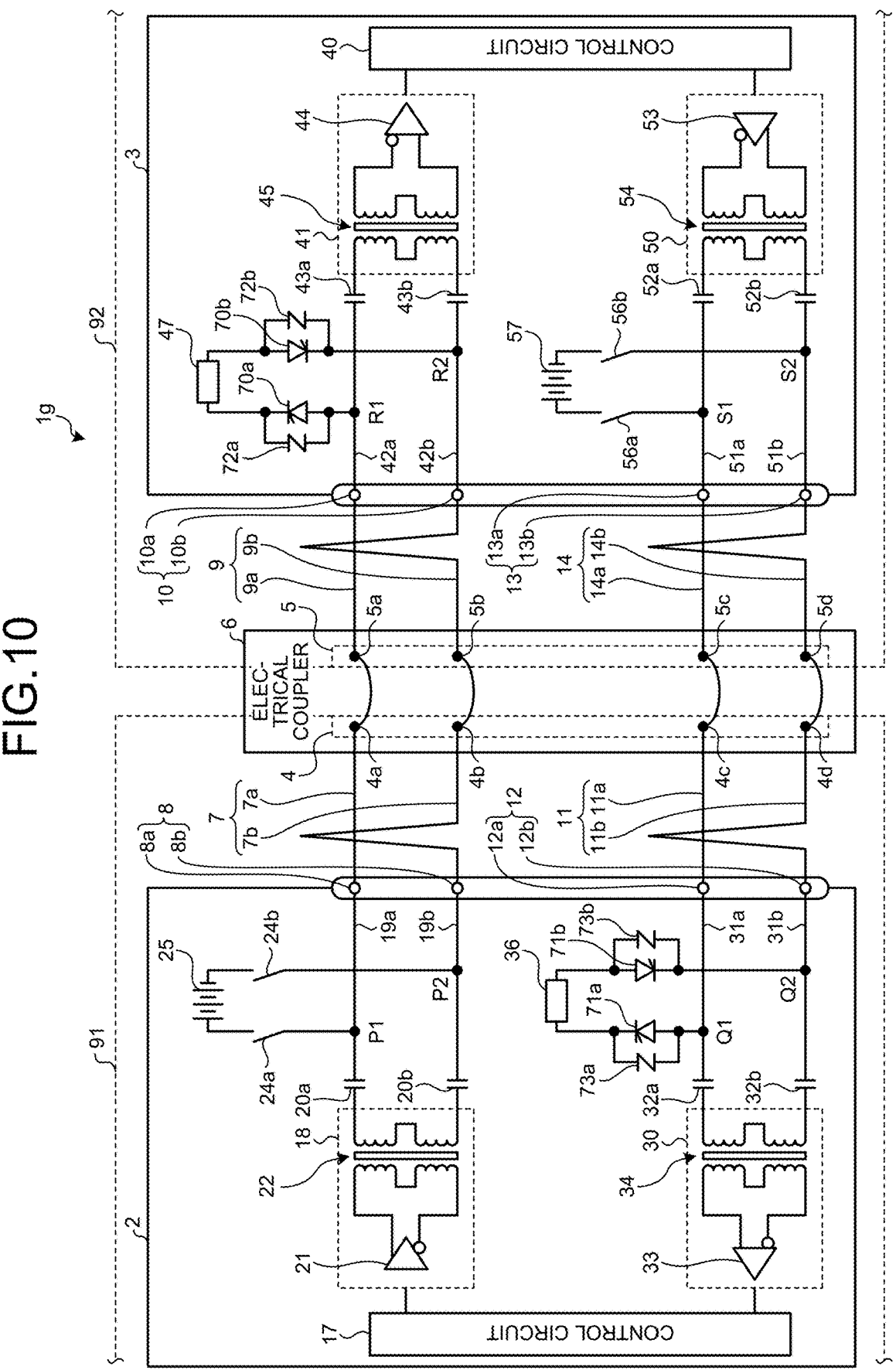
FIG. 10 is a diagram illustrating a configuration of an inter-vehicle transmission system according to an eighth embodiment.

FIG. 10 is a diagram illustrating a configuration of an inter-vehicle transmission system according to the present embodiment. An inter-vehicle transmission system 1g differs from the inter-vehicle transmission system if illustrated in FIG. 9 in that the transmission device 2 includes a varistor 73a and a varistor 73b. The varistor 73a is connected in parallel to the PIN diode 71a and in series to the load resistor 36. The varistor 73b is connected in parallel to the PIN diode 71b and in series to the load resistor 36.

The inter-vehicle transmission system 1g further differs from the inter-vehicle transmission system if illustrated in FIG. 9 in that the transmission device 3 includes a varistor 72a and a varistor 72b. The varistor 72a is connected in parallel to the PIN diode 70a and in series to the load resistor 47. The varistor 72b is connected in parallel to the PIN diode 70b and in series to the load resistor 47.

The other part of the inter-vehicle transmission system 1g is the same as that of the inter-vehicle transmission system 1f illustrated in FIG. 9. In FIG. 10, like reference characters designate the same components as the components illustrated in FIG. 9.

The inter-vehicle transmission system of the present embodiment includes the varistor 72a for protection of the PIN diode 70a, the varistor 72b for protection of the PIN diode 70b, the varistor 73a for protection of the PIN diode 71a, and the varistor 73b for protection of the PIN diode 71b.

Other operations and advantages of the inter-vehicle transmission system 1g of the present embodiment are similar to those of the inter-vehicle transmission system of the seventh embodiment.

Ninth Embodiment

Figure 11:
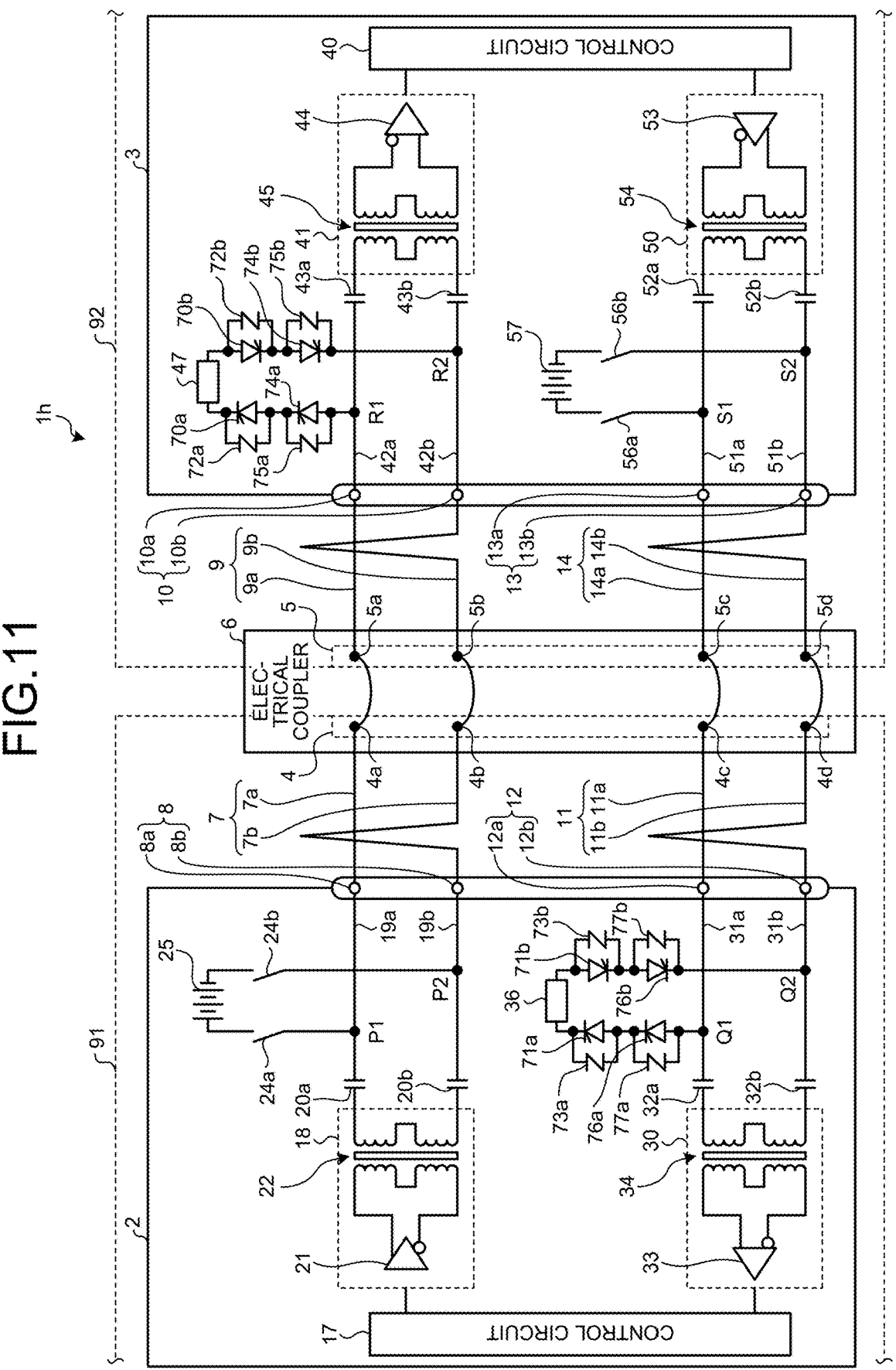
FIG. 11 is a diagram illustrating a configuration of an inter-vehicle transmission system according to a ninth embodiment.

FIG. 11 is a diagram illustrating a configuration of an inter-vehicle transmission system according to the present embodiment. An inter-vehicle transmission system 1h includes, in addition to the components of the inter-vehicle transmission system 1g illustrated in FIG. 10, PIN diodes 76a and 76b and varistors 77a and 77b in the transmission device 2, and PIN diodes 74a and 74b and varistors 75a and 75b in the transmission device 3.

The PIN diode 74a is connected in series to the load resistor 47 and the PIN diode 70a. The varistor 75a is connected in parallel to the PIN diode 74a and in series to the PIN diode 70a. The PIN diode 74b is connected in series to the load resistor 47 and the PIN diode 70b. The varistor 75b is connected in parallel to the PIN diode 74b and in series to the PIN diode 70b. The PIN diodes 74a and 74b are disposed on opposite sides of the load resistor 47.

The PIN diode 76a is connected in series to the load resistor 36 and the PIN diode 71a. The varistor 77a is connected in parallel to the PIN diode 76a and in series to the PIN diode 71a. The PIN diode 76b is connected in series to the load resistor 36 and the PIN diode 71b. The varistor 77b is connected in parallel to the PIN diode 76b and in series to the PIN diode 71b. The PIN diodes 76a and 76b are disposed on opposite sides of the load resistor 36.

The other part of the inter-vehicle transmission system 1h is the same as that of the inter-vehicle transmission system 1g illustrated in FIG. 10. In FIG. 11, like reference characters designate the same components as the components illustrated in FIG. 10.

In the present embodiment, the inter-vehicle transmission system includes the two PIN diodes on each side of the load resistor 47. That is, in the present embodiment, more PIN diodes are connected to the load resistor 47 than in the eighth embodiment. This leads to a higher total forward voltage for the PIN diodes 70a, 70b, 74a, and 74b, thereby more reliably reducing or eliminating the effect of the load resistor 47 on the characteristic impedance of the transmission line when no DC voltage is superposed.

Also according to the present embodiment, the varistors 72a and 72b protect the PIN diodes 70a and 70b. The varistors 75a and 75b protect the PIN diodes 74a and 74b. The varistors 73a and 73b protect the PIN diodes 71a and 71b. The varistors 77a and 77b protect the PIN diodes 76a and 76b.

Although the above description has been made as to signal transmission from the transmission unit 18 to the reception unit 41, the same goes for signal transmission from the transmission unit 50 to the reception unit 30.

The number of the PIN diodes connected in series to the load resistor 47 is not limited to the number of the PIN diodes in the illustrated example, and may generally be plural. In this case, the varistor is connected in parallel to each of the plural PIN diodes. The number of the PIN diodes connected in series to the load resistor 36 is not limited to the number of the PIN diodes in the illustrated example, and may generally be plural. In this case, the varistor is connected in parallel to each of the plural PIN diodes.

Other operations and advantages of the inter-vehicle transmission system 1h of the present embodiment are similar to those of the inter-vehicle transmission system of the seventh embodiment.

Tenth Embodiment

Figure 12:
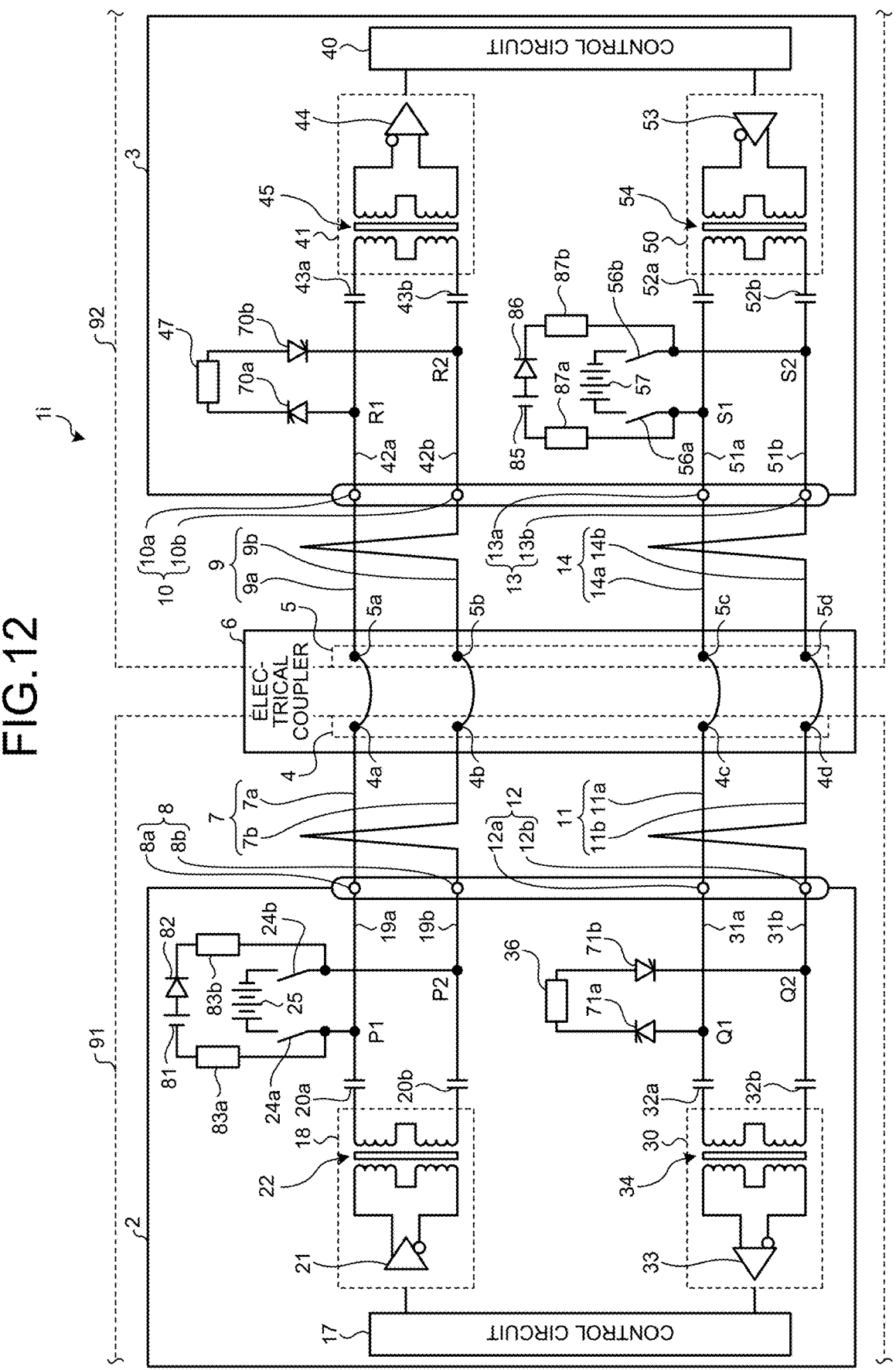
FIG. 12 is a diagram illustrating a configuration of an inter-vehicle transmission system according to a tenth embodiment.

FIG. 12 is a diagram illustrating a configuration of an inter-vehicle transmission system according to the present embodiment. An inter-vehicle transmission system 1i includes a resistor 83a, a DC power supply 81, a diode 82, and a resistor 83b in the transmission device 2, in addition to the components of the inter-vehicle transmission system if illustrated in FIG. 9. The resistor 83a has one end connected to a point between the switch 24a and the connection point P1. The DC power supply 81 has its negative terminal end connected to the other end of the resistor 83a. The diode 82 has its anode side connected to the positive terminal end of the DC power supply 81. The resistor 83b has one end connected to the cathode side of the diode 82, and the other end connected to a point between the switch 24b and the connection point P2. Note that the inter-vehicle transmission system 1i may include either one of the resistors 83a and 83b.

Thus, the resistor 83a, the DC power supply 81, the diode 82, and the resistor 83b are connected in series between the pair of terminals 8. The resistor 83a, the DC power supply 81, the diode 82, and the resistor 83b together form a first reverse bias circuit. That is, during the OFF state of the switches 24a and 24b, i.e., during a time period in which no DC voltage is superposed, the resistor 83a, the DC power supply 81, the diode 82, and the resistor 83b together reverse bias the PIN diodes 70a and 70b.

During a time period in which no DC voltage is superposed on the transmission line from the transmission unit 18 to the reception unit 41, this reverse bias circuit reverse biases the PIN diodes 70a and 70b. This allows the load resistor 47 with a low capacity to be connected to the transmission lines, thereby reducing or eliminating the effect on the characteristic impedance of the transmission line.

The inter-vehicle transmission system 1i also includes, in the transmission device 3, a resistor 87a, a DC power supply 85, a diode 86, and a resistor 87b, in addition to the components of the inter-vehicle transmission system if illustrated in FIG. 9. The resistor 87a has one end connected to a point between the switch 56a and the connection point S1.

The DC power supply 85 has the negative terminal end connected to the other end of the resistor 87a. The diode 86 has its anode side connected to the positive terminal end of the DC power supply 85. The resistor 87b has one end connected to the cathode side of the diode 86, and the other end connected to a point between the switch 56b and the connection point S2. Note that the inter-vehicle transmission system 1i may include either one of the resistors 87a and 87b.

Thus, the resistor 87a, the DC power supply 85, the diode 86, and the resistor 87b are connected in series between the pair of terminals 13. The resistor 87a, the DC power supply 85, the diode 86, and the resistor 87b together form a second reverse bias circuit. That is, during the OFF state of the switches 56a and 56b, i.e., during a time period in which no DC voltage is superposed, the resistor 87a, the DC power supply 85, the diode 86, and the resistor 87b together reverse bias the PIN diodes 71a and 71b.

When no DC voltage is superposed on the transmission line from the transmission unit 50 to the reception unit 30, the second reverse bias circuit reverse biases the PIN diodes 71a and 71b. This allows the load resistor 36 with a low capacity to the transmission lines, thereby reducing or eliminating the effect on the characteristic impedance of the transmission line.

The other part of the configuration and other operations and advantages of the inter-vehicle transmission system 1i are the same as that of the inter-vehicle transmission system if illustrated in FIG. 9. In FIG. 12, like reference characters designate the same components as the components illustrated in FIG. 9.

Eleventh Embodiment

Figure 13:
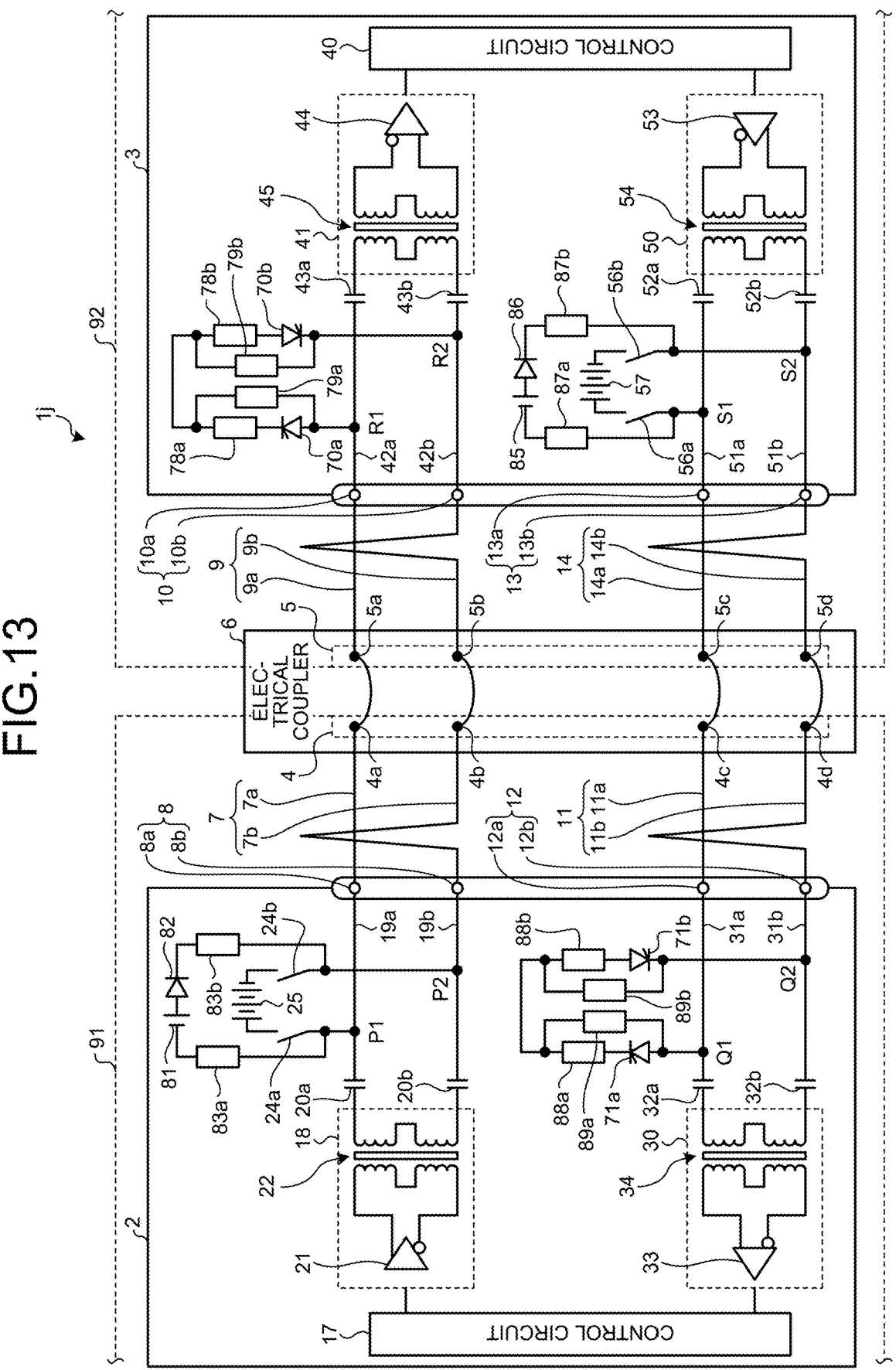
FIG. 13 is a diagram illustrating a configuration of an inter-vehicle transmission system according to an eleventh embodiment.

FIG. 13 is a diagram illustrating a configuration of an inter-vehicle transmission system according to the present embodiment. An inter-vehicle transmission system 1j differs from the inter-vehicle transmission system 1i illustrated in FIG. 12 in that the transmission device 2 includes, between the connection points Q1 and Q2, a load resistor 88a, a load resistor 88b, a load resistor 89a, and a load resistor 89b in place of the load resistor 36. The load resistor 88a is connected in series to the PIN diode 71a and has one end connected to the cathode side of the PIN diode 71a. The load resistor 88b is connected in series to the PIN diode 71b. The load resistor 88b has one end connected to the other end of the load resistor 88a, and the other end connected to the anode side of the PIN diode 71b. The load resistor 89a is connected in parallel to the PIN diode 71a and the load resistor 88a that are connected in series to each other. The load resistor 89b is connected in parallel to the PIN diode 71b and the load resistor 88b that are connected in series to each other. The load resistors 88a and 88b are a first set of load resistors, and the load resistors 89a and 89b are a second set of load resistors.

Similarly to the inter-vehicle transmission system 1i, during a time period in which no DC voltage is superposed on the transmission line from the transmission unit 50 to the reception unit 30, the reverse bias circuit in the transmission device 3 reverse biases the PIN diodes 71a and 71b. In this regard, the resistance values of the load resistors 88a, 88b, 89a, and 89b are set, such that the reverse biases applied to the PIN diodes 71a and 71b are adjusted. The adjustment of the reverse biases applied to the PIN diodes 71a and 71b enables the reverse biases to be applied to the PIN diodes 71a and 71b at an arbitrary ratio.

The inter-vehicle transmission system 1j further differs from the inter-vehicle transmission system 1i illustrated in FIG. 12 in that the transmission device 3 includes, between the connection points R1 and R2, a load resistor 78a, a load resistor 78b, a load resistor 79a, and a load resistor 79b, in place of the load resistor 47. The load resistor 78a is connected in series to the PIN diode 70a and has one end connected to the cathode side of the PIN diode 70a. The load resistor 78b is connected in series to the PIN diode 70b. The load resistor 78b has one end connected to the other end of the load resistor 78a, and the other end connected to the anode side of the PIN diode 70b. The load resistor 79a is connected in parallel to the PIN diode 70a and the load resistor 78a that are connected in series to each other. The load resistor 79b is connected in parallel to the PIN diode 70b and the load resistor 78b that are connected in series to each other. The load resistors 78a and 78b are a first set of load resistors, and the load resistors 79a and 79b are a second set of load resistors.

Similarly to the inter-vehicle transmission system 1i, during a time period in which no DC voltage is superposed on the transmission line from the transmission unit 18 to the reception unit 41, the reverse bias circuit in the transmission device 2 reverse biases the PIN diodes 70a and 70b. In this regard, the resistance values of the load resistors 78a, 78b, 79a, and 79b are set, such that the reverse biases applied to the PIN diodes 70a and 70b are adjusted. The adjustment of the reverse biases applied to the PIN diodes 70a and 70b enables the reverse biases to be applied to the PIN diodes 70a and 70b at an arbitrary ratio.

The other part of the configuration and other operations and advantages of the inter-vehicle transmission system 1j are the same as that of the inter-vehicle transmission system 1i illustrated in FIG. 12. In FIG. 13, like reference characters designate the same components as the components illustrated in FIG. 12.

Twelfth Embodiment

Figure 14:
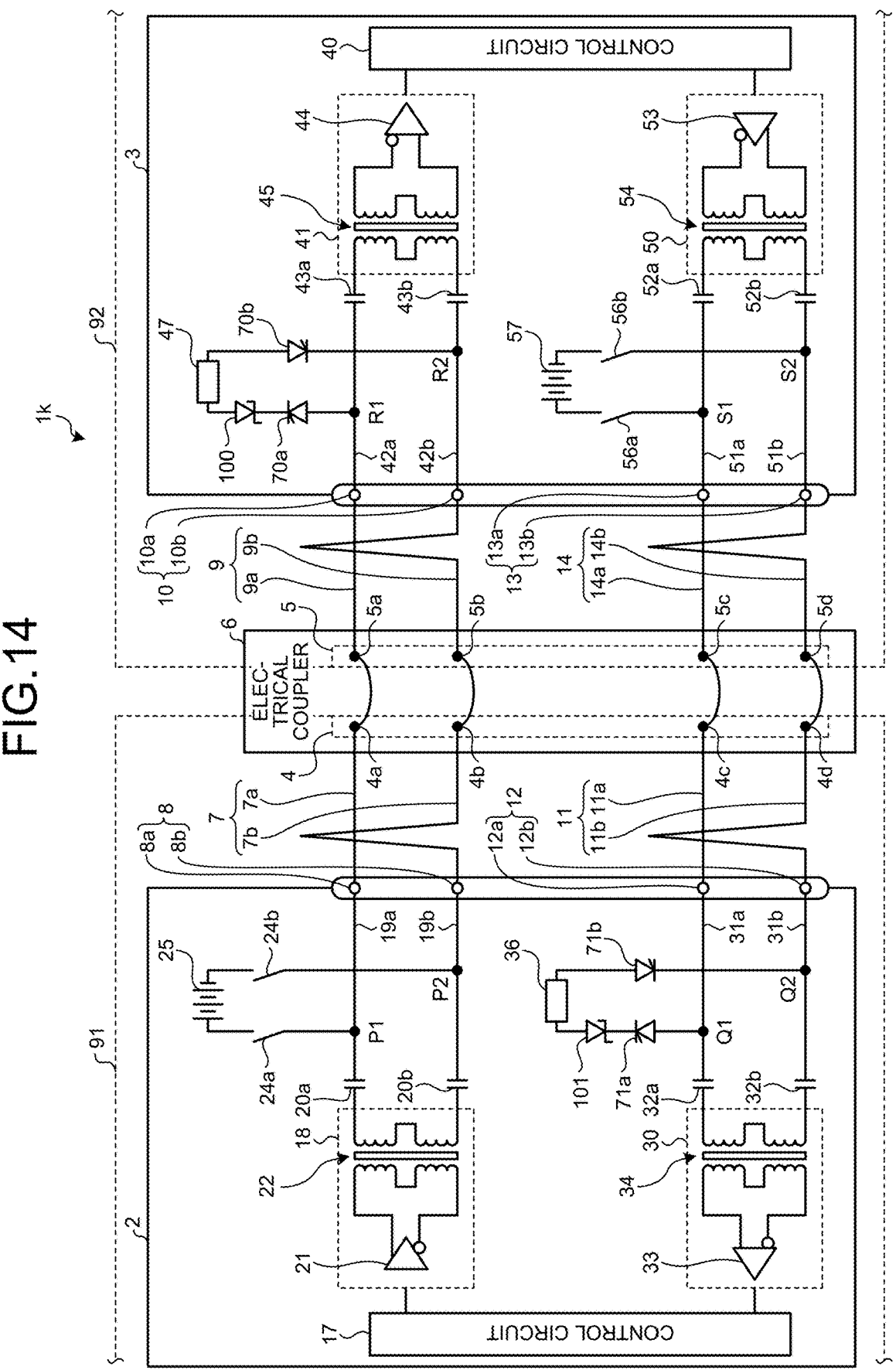
FIG. 14 is a diagram illustrating a configuration of an inter-vehicle transmission system according to a twelfth embodiment.

FIG. 14 is a diagram illustrating a configuration of an inter-vehicle transmission system according to the present embodiment. An inter-vehicle transmission system 1k differs from the inter-vehicle transmission system if illustrated in FIG. 9 in that the transmission device 2 includes a Zener diode 101. The Zener diode 101 is connected in series between the PIN diode 71a and the load resistor 36. The anode side of the Zener diode 101 is connected to the cathode side of the PIN diode 71a, while the cathode side of the Zener diode 101 is connected to the load resistor 36.

The inter-vehicle transmission system 1k further differs from the inter-vehicle transmission system if illustrated in FIG. 9 in that the transmission device 3 includes a Zener diode 100. The Zener diode 100 is connected in series between the PIN diode 70a and the load resistor 47. The anode side of the Zener diode 100 is connected to the cathode side of the PIN diode 70a, while the cathode side of the Zener diode 100 is connected to the load resistor 47.

The other part of the configuration of the inter-vehicle transmission system 1k is the same as that of the inter-vehicle transmission system if illustrated in FIG. 9. In FIG. 14, like reference characters designate the same components as the components illustrated in FIG. 9.

In the present embodiment, during a time period in which no DC voltage is superposed, that is, when the switches 24a and 24b are placed in the OFF state under the control of the control circuit 17, no current flows through the diodes 70a, 70b and 100 and the load resistance 47, unless a voltage applied to the diodes 70*a*, 70*b*, and 100 reaches the sum of the forward voltages of the PIN diodes 70*a* and 70*b* and the breakdown voltage of the Zener diode 100. As a result, the load resistor 47 is substantially disconnected from the transmission lines. In the present embodiment, the voltage that allows a current to flow through the load resistor 47 can be freely adjusted by the characteristic of the breakdown voltage of the Zener diode 100.

Similarly, during a time period in which no DC voltage is superposed, that is, when the switches 56*a* and 56*b* are placed in the OFF state under the control of the control circuit 40, no current flows through the diodes 71*a*, 71*b* and 101 and the load resistor 36, unless a voltage applied to the diodes 71*a*, 71*b* and 101 reaches the sum of the forward voltages of the PIN diodes 71*a* and 71*b* and the breakdown voltage of the Zener diode 101. As a result, the load resistor 36 is substantially disconnected from the transmission lines. The present embodiment allows adjustment of the voltage that allows a current to flow through the load resistor 36 to any value based on the characteristic of the breakdown voltage of the Zener diode 101.

Other operations and advantages of the inter-vehicle transmission system 1*k* of the present embodiment are similar to those of the inter-vehicle transmission system of the seventh embodiment.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1, 1*a*, 1*b*, 1*c*, 1*d*, 1*e*, 1*f*, 1*g*, 1*h*, 1*i*, 1*j*, 1*k* inter-vehicle transmission system; 2, 3 transmission device; 4, 5, 6 electrical coupler; 4*a*, 4*b*, 4*c*, 4*d*, 5*a*, 5*b*, 5*c*, 5*d* contact; 7, 7*a*, 7*b*, 9, 9*a*, 9*b*, 11, 11*a*, 11*b*, 14, 14*a*, 14*b*, 19*a*, 19*b*, 31*a*, 31*b*, 42*a*, 42*b*, 51*a*, 51*b* signal line; 8, 8*a*, 8*b*, 10, 10*a*, 10*b*, 12, 12*a*, 12*b*, 13, 13*a*, 13*b* terminal; 17, 40 control circuit; 17*a* processor; 17*b* memory; 18, 50 transmission unit; 20*a*, 20*b*, 32*a*, 32*b*, 43*a*, 43*b*, 52*a*, 52*b* capacitor; 21, 53 transmission circuit; 22, 34, 45, 54 pulse transformer; 35, 37, 46, 48 inductance; 24*a*, 24*b*, 56*a*, 56*b* switch; 25, 57, 81, 85 DC power supply; 30, 41 reception unit; 33, 44 reception circuit; 36, 36*a*, 36*b*, 47, 47*a*, 47*b*, 78*a*, 78*b*, 79*a*, 79*b*, 88*a*, 88*b*, 89*a*, 89*b* load resistor; 61*a*, 61*b*, 62*a*, 62*b*, 83*a*, 83*b*, 87*a*, 87*b* resistor; 63*a*, 63*b*, 64*a*, 64*b*, 72*a*, 72*b*, 73*a*, 73*b*, 75*a*, 75*b*, 77*a*, 77*b* varistor; 70*a*, 70*b*, 71*a*, 71*b*, 74*a*, 74*b*, 76*a*, 76*b* PIN diode; 82, 86 diode; 91, 92 vehicle; 100, 101 Zener diode.

The invention claimed is:

1. An inter-vehicle transmission system comprising:
    a first transmission device disposed in a first vehicle including a first electrical coupler; and
    a second transmission device disposed in a second vehicle including a second electrical coupler electrically connected to the first electrical coupler, the second transmission device being capable of communicating with the first transmission device,
    wherein
    the first transmission device includes
        a first pair of terminals connected to the first electrical coupler via a first pair of signal lines,
        a transmitter connected to the first pair of terminals via a first pair of capacitors,
        a direct-current power supply connected in series between the first pair of terminals without interposition of the first pair of capacitors, and
        first and second switches connected in series to the direct-current power supply between the first pair of terminals, the first and second switches being disposed on opposite sides of the direct-current power supply,
    the second transmission device includes
        a second pair of terminals connected to the second electrical coupler via a second pair of signal lines,
        a receiver connected to the second pair of terminals via a second pair of capacitors,
        a load resistor connected in series between the second pair of terminals without interposition of the second pair of capacitors, and
        at least one PIN diode connected in series to the load resistor between the second pair of terminals, and
    when the first and second switches are placed in an ON state, the direct-current power supply applies a forward bias to the PIN diode,
    wherein the first and second switches are placed in the ON state for a certain time period since (a) start-up of the inter-vehicle transmission system or (b) a time point when the first electrical coupler and the second electrical coupler are electrically coupled together, and the switches are turned off after a lapse of the certain time period,
    wherein
    the second transmission device includes a varistor connected in parallel to the PIN diode and in series to the load resistor, and
    the at least one PIN diode is a plurality of PIN diodes, wherein the varistor is one of a plurality of varistors, and wherein a number of the plurality of PIN diodes is equal to a number of the plurality of varistors.

2. The inter-vehicle transmission system according to claim 1, wherein the at least one PIN diode is a pair of PIN diodes disposed on opposite sides of the load resistor.

3. The inter-vehicle transmission system according to claim 1, wherein the first and second switches are placed in the ON state for a certain time period after a detection of an erroneous transmission, and are turned off after a lapse of the certain time period.

4. A transmission device disposed in a vehicle and capable of communicating with another transmission device in another vehicle connected to the vehicle through an electrical coupler, the transmission device comprising:
    a first pair of terminals connected to the electrical coupler via a first pair of signal lines;
    a transmitter connected to the first pair of terminals via a first pair of capacitors;
    a direct-current power supply connected in series between the first pair of terminals without interposition of the first pair of capacitors;
    first and second switches connected in series to the direct-current power supply between the first pair of terminals, and disposed on opposite sides of the direct-current power supply;
    a second pair of terminals connected to the electrical coupler via a second pair of signal lines;
    a receiver connected to the second pair of terminals via a second pair of capacitors;
    a load resistor connected in series between the second pair of terminals without interposition of the second pair of capacitors; and a PIN diode connected in series to the load resistor between the second pair of terminals, wherein:

during an ON state of the first and second switches, the direct-current power supply forms a closed circuit together with a load resistor of the other transmission device in the other vehicle to forward bias a PIN diode of the other transmission device in the other vehicle, and the first and second switches are placed in the ON state for a certain time period since (a) start-up of the inter-vehicle transmission system or (b) a time point when the first electrical coupler and the second electrical coupler are electrically coupled together, and the switches are turned off after a lapse of the certain time period, wherein the second transmission device includes a varistor connected in parallel to the PIN diode and in series to the load resistor, and the at least one PIN diode is a plurality of PIN diodes, wherein the varistor is one of a plurality of varistors, and wherein a number of the plurality of PIN diodes is equal to a number of the plurality of varistors.

* * * * *